United States Patent
Salomaki

(10) Patent No.: US 9,848,305 B2
(45) Date of Patent: Dec. 19, 2017

(54) MOBILE INSTANT MESSAGING AND PRESENCE SERVICE

(75) Inventor: Ari Salomaki, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 1039 days.

(21) Appl. No.: 10/144,260

(22) Filed: May 10, 2002

(65) Prior Publication Data
US 2003/0065788 A1 Apr. 3, 2003

Related U.S. Application Data

(60) Provisional application No. 60/290,123, filed on May 11, 2001.

(30) Foreign Application Priority Data

Nov. 7, 2001 (FI) ..................................... 20012158

(51) Int. Cl.
*H04W 4/08* (2009.01)
*G06Q 10/10* (2012.01)
(Continued)

(52) U.S. Cl.
CPC .............. *H04W 4/08* (2013.01); *G06Q 10/06* (2013.01); *G06Q 10/10* (2013.01); *G06Q 10/105* (2013.01);
(Continued)

(58) Field of Classification Search
CPC .. G06Q 40/125; G06Q 10/1091; G06Q 10/06; G06Q 10/10; G06Q 10/105
(Continued)

(56) References Cited

U.S. PATENT DOCUMENTS 6,047,327 A 4/2000 Tso et al.
6,301,609 B1 * 10/2001 Aravamudan et al. ....... 709/207
(Continued)

FOREIGN PATENT DOCUMENTS

BR 9702280 A 7/1999
BR 200101149 A 10/2001
(Continued)

OTHER PUBLICATIONS

U.S. Appl. No. 60/266,559.*
(Continued)

*Primary Examiner* — Fawaad Haider
(74) *Attorney, Agent, or Firm* — Ditthavong & Steiner, P.C.

(57) ABSTRACT

The invention relates to mobile messaging and presence services. According to one aspect of the invention, a client device of the mobile messaging system adds a qualifier to a presence attribute, the qualifier comprising one or more parameters specifying the use of the attribute. A client device receiving a presence attribute processes the received presence attribute according to the qualifier parameters in the received attribute. Another aspect of the invention is the showing of how to assemble and store presence items with names, attributes and values in a single presence set within a role having an associated authorization group of members that have the right to subscribe to the whole or part of the presence set of the same role.

8 Claims, 7 Drawing Sheets

(51) Int. Cl.
*G06Q 40/00* (2012.01)
*G06Q 10/06* (2012.01)
*H04L 29/06* (2006.01)
*H04L 12/58* (2006.01)
*H04L 29/08* (2006.01)
*H04W 4/12* (2009.01)
*H04W 8/18* (2009.01)

(52) U.S. Cl.
CPC ....... *G06Q 10/1091* (2013.01); *G06Q 40/125* (2013.12); *H04L 29/06* (2013.01); *H04L 51/04* (2013.01); *H04L 51/38* (2013.01); *H04L 67/22* (2013.01); *H04L 67/24* (2013.01); *H04L 67/28* (2013.01); *H04L 67/306* (2013.01); *H04W 8/186* (2013.01); *H04L 67/2819* (2013.01); *H04L 67/2842* (2013.01); *H04W 4/12* (2013.01); *H04W 8/18* (2013.01)

(58) Field of Classification Search
USPC .................................. 709/204–207; 705/32
See application file for complete search history.

(56) References Cited

U.S. PATENT DOCUMENTS

| | | | |
|---|---|---|---|
| 6,512,930 B2 * | 1/2003 | Sandegren | 455/518 |
| 6,549,768 B1 * | 4/2003 | Fraccaroli | 455/456.3 |
| 6,658,095 B1 * | 12/2003 | Yoakum et al. | 379/93.01 |
| 6,668,173 B2 * | 12/2003 | Greene | 709/207 |
| 6,697,840 B1 * | 2/2004 | Godefroid et al. | 709/205 |
| 6,714,791 B2 * | 3/2004 | Friedman | 709/204 |
| 6,781,972 B1 | 8/2004 | Anderlind et al. | |
| 6,968,179 B1 * | 11/2005 | De Vries | 455/414.1 |
| 2001/0027111 A1 | 10/2001 | Motegi et al. | |
| 2002/0065894 A1 * | 5/2002 | Dalal et al. | 709/206 |
| 2002/0116461 A1 * | 8/2002 | Diacakis | G06Q 10/087 709/204 |
| 2003/0001890 A1 * | 1/2003 | Brin | H04L 12/1822 715/753 |
| 2003/0018704 A1 * | 1/2003 | Polychronidis et al. | 709/202 |
| 2003/0028597 A1 * | 2/2003 | Salmi | G06F 21/6245 709/204 |
| 2003/0065788 A1 | 4/2003 | Salomaki | |

FOREIGN PATENT DOCUMENTS

| | | |
|---|---|---|
| BR | 200008540 A | 11/2001 |
| BR | 199814503 A | 7/2002 |
| EP | 1071295 | 1/2001 |
| EP | 1139608 | 10/2001 |
| EP | 1176840 | 1/2002 |
| EP | 1397923 A1 | 3/2004 |
| EP | 1397923 B1 | 4/2005 |
| EP | 1528754 A1 | 5/2005 |
| EP | 1528754 B1 | 1/2008 |
| FI | 20012158 A | 5/2003 |
| FI | 114429 B | 10/2004 |
| JP | 6-35821 | 2/1994 |
| JP | 9-312622 | 12/1997 |
| JP | 10-334051 | 12/1998 |
| JP | 11-177476 | 7/1999 |
| JP | 2000-099417 | 4/2000 |
| JP | 2000-276416 | 10/2000 |
| JP | 2000-332814 | 11/2000 |
| KR | 20030096373 A | 12/2003 |
| KR | 100653935 B1 | 12/2006 |
| WO | 199747121 A2 | 12/1997 |
| WO | 9934628 | 7/1999 |
| WO | 199933293 A1 | 7/1999 |
| WO | 0051391 | 8/2000 |
| WO | 0070807 | 11/2000 |
| WO | 0130057 | 4/2001 |
| WO | 0145342 | 6/2001 |
| WO | 0156308 | 8/2001 |
| WO | 0191486 | 11/2001 |
| WO | 02054745 | 7/2002 |
| WO | 2002093959 A1 | 11/2002 |

OTHER PUBLICATIONS

Brown, Kevin Allen. Communication protocols for wireless mobile networks. University of South Carolina, ProQuest Dissertations Publishing, 1997.*
"Wireless Village, The Mobile IMPS Initiative, White Paper" Apr. 26, 2001.
Privacy-enhanced Presence Protocol (PePP), H. Sugano et al., Jun. 2000, The Internet Society © 2000.
Canadian Office Action for corresponding CA Application No. 2,445,768, dated Nov. 9, 2009, Canada, pp. 1-2.
Japanese Office action for corresponding JP App. No. 2007-150984 dated May 25, 2010, pp. 1-8.
Japanese Office action for corresponding JP App. No. 2002-590697 dated Jun. 1, 2010, pp. 1-41.
Virtual Community Presence Awareness, Boyer et al. ACM Siggroup Bulletin vol. 19, No. 3, 1998, pp. 11-14.
Canadian Office Action for corresponding CA Application No. 2,445,768, dated Dec. 3, 2010, Canada, pp. 1-2.
Japanese Office action for corresponding JP App. No. 2002-590697, trial No. 2007-013273, dated Feb. 8, 2011, pp. 1-19.
E. Isaacs et al., "Hubbub: A wireless instant messenger that uses earcons for awareness and for sound instant messages", CHI 2001, Mar. 31-Apr. 5, pp. 3-4.
A. Narayanan, "Realms and States: A Framework for Location Aware Mobile Computing", WMC '01 Proceedings of the 1st international workshop on Mobile commerce, 2001, 7 pages.
Office Action for corresponding Brazilian Patent Application No. PI0209592-0, dated Sep. 18, 2015 with English-language summary, 5 Pages.

* cited by examiner

MOBILE INSTANT MESSAGING AND PRESENCE SERVICE

PRIORITY CLAIM

This application claims priority to, and the benefit of U.S. Provisional Application Ser. No. 60/290,123, titled "DYNAMIC PHONEBOOK SERVICE", filed May 11, 2001. In addition, this application also claims priority to, and the benefit of, Finnish Application No. 20012158, filed Jul. 11, 2001, the disclosures of which are incorporated herein by reference in their entireties.

BACKGROUND OF THE INVENTION

The present invention relates to messaging in mobile telecommunication systems and more particularly to presence attributes in a mobile instant messaging and presence service.

An instant messaging service provides the end users with a means for fast, interactive, mainly text-based communication. The utility of instant messaging is greatly enhanced by the addition of a service that will keep track of the online status and availability of your chat partners or "friends"; as well as notify you of changes to their status or availability. This type of service is called a "presence service". In general, presence can be considered containing various dynamic information on a user or client connected to the instant messaging service via various means. Examples of this information is reachability, availability and location of the user for communication. The combination of instant messaging and presence services is called an instant messaging and presence service (IMPS). This kind of service has been available for wireline Internet users but the interconnectivity between wireline users and mobile users has been missing.

Wireless Village initiative has been established to define specifications for mobile instant messaging and presence service. The Wireless Village Instant Messaging and Presence Service (IMPS) includes four primary features: presence, instant messaging, groups and shared content. Shared content allows users and operators to setup their own storage area where they can post pictures, music and other multimedia content while enabling the sharing with other individuals and groups in an IM or chat session. The Wireless Village initiative enables both operators and end-users to create and manage groups. Presence is the key enabling technology for the Wireless Village initiative. In the existing Internet-based instant messaging service, the presence values are usually very simple, such as user is active, absent, not willing to communicate etc. These values are selected from the predefined sets of values. A white paper has been published on the Wireless Village mobile IMPS solution: "*Wireless Village, The Mobile IMPS Initiative:White Paper*", dated on Apr. 26, 2001. The existing mobile terminal can be considered a personal tool which reflects the personal status more accurately than a desktop computer. Considering the wide range of information that may be obtained from the user and the mobile terminal, the anticipation of the presence information domain is very difficult. Thus a mechanism should be developed to enable easy usage and addition of new types of presence information.

DISCLOSURE OF INVENTION

An object of the invention is to provide a solution for creation of new presence attributes besides already determined presence attributes.

Another object of the invention is to show how to organize and store presence attributes for use by clients.

According to a first aspect of the invention, a client device of a mobile messaging system adds a qualifier to a presence attribute, the qualifier comprising one or more parameters specifying the use of the attribute. A client device receiving a presence attribute processes the received presence attribute according to the qualifier parameters in the received attribute. A presence attribute is a collection of data describing presence information on a certain user and/or a client device, the presence information intended for other users. A presence attribute may also contain information for machine-to-machine communication between the client devices.

In further accord with the first aspect of the present invention, a mobile messaging system comprising at least one client device and a server, wherein the client device comprises means for transmitting presence information as presence attributes to the server and means for receiving presence attributes from the server, the presence information being categorized by a plurality of presence attribute types identified by attribute name, and the server comprises means for maintaining presence information based on the received presence attributes, is characterized in that the client device comprises means for adding a qualifier to a presence attribute, the qualifier comprising one or more parameters specifying the use of the attribute, and the client device comprises means for processing a received presence attribute according to the qualifier parameters in the received attribute.

According to a second aspect of the invention, the client device composes presence information attributes that are identified by a combination of an authorizer, an attribute name and a qualifier, wherein the authorizer specifies the body responsible for maintaining the attribute and the qualifier specifies the use of the attribute. When receiving a presence attribute, the server and the client device search for already stored attributes containing same identifiers as the received attribute. An attribute already stored is replaced with the received attribute if the combination of identifiers of the received attribute is identical to that of the already stored attribute. Otherwise the received attribute is added without replacing any previous attribute.

In further accord with the second aspect of the present invention, a mobile messaging system comprising at least one client device and a server, wherein the client device comprises means for transmitting presence information as presence attributes to the server and means for receiving presence attributes from the server, the presence information being categorized by a plurality of presence attribute types identified by attribute name, and the server comprises means for maintaining presence information based on received presence attributes, is characterized in that the client device comprises means for composing a presence information attribute identified by a combination of an authorizer, an attribute name and a qualifier, the authorizer specifying the body responsible for maintaining the attribute and the qualifier specifying the use of the attribute, the server comprises means for searching for an already stored attribute containing same identifiers as a received attribute and means for replacing the already stored attribute with the received attribute if the combination of identifiers of the received attribute is identical to that of the already stored attribute or otherwise adding the received attribute, and the client device comprises means searching for an already stored attribute containing same identifiers as a received attribute and means for replacing the already stored attribute with the received attribute if the combination of identifiers of the received attribute is identical to that of the already stored attribute or otherwise adding the received attribute.

In further accord with the first and second aspects of the present invention, the system is characterized in that the client device comprises means for specifying in the qualifier the presentation settings of the attribute, and the client device comprises means for presenting the received attribute on the basis of the qualifier.

In still further accord with the first and second aspects of the present invention, the system is characterized in that the client device comprises means for specifying in the qualifier the application to which the attribute should be addressed, and the client device comprises means for addressing the received attribute to the application indicated by the qualifier.

Still further in accord with the first and second aspects of the invention, the system is characterized in that the server comprises means for determining on the basis of the qualifier whether to send the attribute to one or more client devices.

According further to the first and second aspects of the invention, the system is characterised in that the presence attributes received from the client device by the server are stored in a database according to a publisher user in association with a presence group.

In accordance still further to the first and second aspects of the invention, the system is characterized in that each presence attribute is part of an item including an attribute name element and an attribute value. The name element may include an authority string indicative of an authority responsible for keeping the name element and attribute value unique.

According still further to the first and second aspects of the present invention, the system is characterized in that a presence set comprises one or more presence attributes belonging to a single publisher role of a publisher user in association with a single presence group.

In still further accord with the first and second aspects of present invention, a mobile messaging system is characterized in that a user of the client device as a publisher is able to use the client device or more than one client device in more than one publisher role.

According to a third aspect of the present invention, a mobile client device for mobile messaging system, the client device comprising means for transmitting presence information as presence attributes to a server, the presence information being categorized by a plurality of presence attribute types identified by attribute name, is characterized in that the client device further comprises means for adding a qualifier to a presence attribute, the qualifier comprising one or more parameters specifying the use of the attribute.

According to a fourth aspect of the present invention, a mobile client device for mobile messaging system, the client device comprising means for receiving presence attributes from a server, the presence information being categorized by a plurality of presence attribute types identified by attribute name is characterized in that the client device further comprises means for adding a qualifier to a presence attribute, the qualifier comprising one or more parameters specifying the use of the attribute, and means for processing a received presence attribute according to the qualifier parameters in the received attribute.

According to a fifth aspect of the present invention, a mobile client device for mobile messaging system, the client device comprising means for transmitting presence information as presence attributes to the server, and means for receiving presence attributes from the server, the presence information being categorized by a plurality of presence attribute types identified by attribute name, is characterized in that the client device further comprises means for composing a presence information attribute identified by a combination of an authorizer, an attribute name and a qualifier, the authorizer specifying the body responsible for maintaining the attribute and the qualifier specifying the use of the attribute, means for searching for an already stored attribute containing same identifiers as a received attribute, and means for replacing the already stored attribute with the received attribute if the combination of identifiers of the received attribute is identical to that of the already stored attribute or otherwise adding the received attribute.

According further to the third, fourth and fifth aspects of the present invention, a mobile client device is characterized in that each presence attribute is part of an item including an attribute name element and an attribute value. The name element may include an authority string indicative of an authority responsible for keeping the name element and attribute value unique.

In further accord with the third, fourth and fifth aspects of the present invention, the mobile client device is characterized in that a presence set comprises one or more presence attributes belonging to a single publisher role of a publisher user in association with a single presence group.

In still further accord with the third, fourth and fifth aspects of the present invention, the mobile client device is characterized in that a user of the mobile client device as a publisher is able to use the client device or more than one client device in more than one publisher role.

According to a sixth aspect of the present invention, a server for a mobile messaging system, the server comprising means for maintaining presence information based on received presence attributes, the presence information being categorized by a plurality of presence attribute types identified by attribute name, is characterized in that the server further comprises means for searching for an already stored attribute containing same identifiers as a received attribute, and means for replacing the already stored attribute with the received attribute if the combination of identifiers of the received attribute is identical to that of the already stored attribute or otherwise adding the received attribute.

In further accord with the sixth aspect of the present invention, the server is characterized in that the presence attributes received from a client device by the server is stored in a database according to a publisher user in association with a presence group.

In still further accord with the sixth aspect of the present invention, the server is characterized in that each presence attribute is part of an item including an attribute name element and an attribute value. The name element may include an authority string indicative of an authority responsible for keeping the name element and attribute value unique.

Still further in accord with the sixth aspect of the present invention, the server is characterized in that a presence set comprises one or more presence attributes belonging to a single publisher role of a publisher user in association with a single presence group. A user of a client device in communication with the server acting as a publisher is able to use the client device or more than one client device in more than one publisher role.

According to a seventh aspect of the present invention, a presence system, comprises at least one physical device having at least one presence client for enabling a presence user to interact with the system as a publisher or a subscriber, and a server for maintaining valid values of presence sets of attributes of a publisher for access by subscribers according to associated presence groups.

In further accord with the seventh aspect of the present invention, a presence system is characterized in that each attribute is part of an item including an attribute name element and an attribute value. The name element may include a qualifier having information related to attribute usage. The name element may include an authority string indicative of an authority responsible for keeping the name element and attribute value unique.

In still further accord with the seventh aspect of the present invention, the presence system is characterized in that a presence set comprises one or more attributes belonging to a single publisher role in association with a single presence group. The user interacting with the system as a publisher is able to use the presence client or more than one presence client in more than one publisher role. Each attribute may be part of an item including an attribute name element an attribute value.

Still further in accord with the seventh aspect of the present invention, the at least one physical device is a mobile physical device.

According to an eighth aspect of the present invention, a computer program embodied in a computer-readable medium for storage in a physical device, is characterized in that the program is a presence client program for enabling a presence user to interact with a presence system as a publisher of at least one presence set of attributes for access by one or more subscribers according to an associated at least one presence group.

In further accord with the eighth aspect of the present invention, the presence client program is characterized in that the program enables a presence user to interact with the presence system as a subscriber to at least one set of attributes associated with a presence group in which the subscriber is a member.

In still further accord with the eighth aspect of the present invention, the presence client program is characterized in that each attribute is part of an item including an attribute name element and an attribute value. The name element may include a qualifier having information related to attribute usage.

According further to the eighth aspect of the present invention, the presence client program is characterized in that the name element includes an authority string indicative of an authority responsible for keeping the name element and attribute value unique.

In accordance still further with the eighth aspect of the present invention, the presence client program is characterized in that a presence set comprises one or more attributes belonging to a single publisher role in association with a single presence group. A user interacting with the system as a publisher is able to use the presence client program or more than one presence client program in more than one publisher role. Each attribute may part of an item including an attribute name element and an attribute value.

Still further in accord with the eighth aspect of the present invention, the presence client program is characterized in that the physical device is a mobile physical device.

According to a ninth aspect of the present invention, a physical device having a computer program embodied in a computer-readable medium stored therein, is characterized in that the program is a presence client program according to the eighth aspect of the present invention.

According to a tenth aspect of the present invention, a data structure embodied in a computer-readable medium for storage in a physical device, is characterized in that the data structure is a presence database for storing valid values of presence sets of attributes of one or more publishers for access by subscribers according to presence groups associated with the presence sets.

In further accord with the tenth aspect of the present invention, a data structure is characterized in that each attribute is part of an item including an attribute name element and an attribute value. The name element may include a qualifier having information related to attribute usage. The name element may include an authority string indicative of an authority responsible for keeping the name element and attribute value unique.

In still further accord with the tenth aspect of the present invention, a presence set comprises one or more attributes belonging to a single publisher role in association with a single presence group.

Further still in accord with the tenth aspect of the present invention, the data structure is characterized in that a user interacting with the physical device as a publisher is able to use the data structure to publish more than one publisher role, each role having distinct presence sets in association with distinct presence groups.

In accordance still further with the tenth aspect of the present invention, a data structure is characterized in that the physical device is a mobile device.

According to an eleventh aspect of the present invention, a physical device having a data structure embodied in a computer-readable medium stored therein, is characterized in that the data structure is a presence database according to the tenth aspect of the present invention.

Advantages of the invention are that it is possible to adjust predetermined presence attributes by adding a qualifier. The qualifier may be used to add a new attribute (as an attribute with a qualifier can be uniquely identified, i.e. functionally separated from an attribute with same attribute name but without qualifier). Thus e.g. users or application developers can easily determine new presence attributes best fitting their needs or describing their current actual status without being limited to the predetermined types. The use of the qualifier brings another advantage as it enables the sender of presence information (the owner) to further specify how the presence information is to be used in the receiving client device.

In one embodiment of the invention the application to which the attribute should be addressed is specified in the qualifier. The received attribute is addressed to the application indicated in the qualifier. The further advantage of this embodiment is that the sending client device may define the used application and thereby use qualifier to direct certain presence information to a certain application.

Another advantage of the invention is the showing of how to assemble presence items with names, attributes and values in a single presence set within a role having an associated authorization group of members that have the right to subscribe to the whole or part of the presence set of the same role.

BRIEF DESCRIPTION OF THE DRAWINGS

In the following, the invention will be described in further detail by means of preferred embodiments and with reference to the accompanying drawings, in which.

BEST MODE FOR CARRYING OUT THE INVENTION

Figure 1:
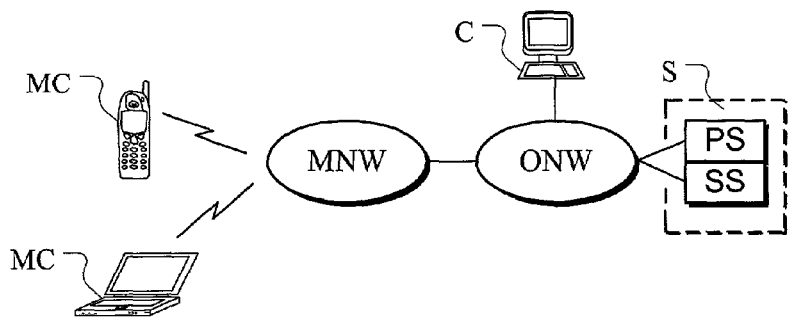
FIG. 1 is a block diagram illustrating a mobile IMPS system.

FIG. 1 illustrates a mobile IMPS system. A number of mobile clients (MC) can be connected via a mobile network MNW and possibly one or more intermediary networks ONW to an IMPS server S. Typically the Internet is used as the intermediary network, also non-mobile clients C may be served by the IMPS system. The IMPS server S can be, as regards presence services, functionally divided into server elements: A publisher server PS that is the home service element for a publishing client owning the presence information and a subscriber server SS that is the home for a subscribing or requesting client. Thus the client MC is served by both servers; the MC updates its presence information to the PS and acts as a publishing client and on the other hand requests and receives presence information relating to other clients as presence attributes from the subscriber server SS. The server PS maintains presence data and manages its distribution based on the users' publishing preferences relating to presence information. The functions of SS and PS may be carried out on one physical server device or distributed to a plurality of server devices.

It should be noted that the present description focuses on presence related service capabilities. Other important mobile IMPS service capabilities are messaging capabilities, user group management capabilities, content management capabilities, subscriber management capabilities, and client capabilities. Mobile IMPS services are created by using these service capabilities. For instance, a client MC may belong to several user groups and the server S manages the group memberships, handles instant messaging and delivers presence information between the members of the group. One important role of the server is also to control information flow; the server may have filters on the basis of user preferences defining e.g. what presence or other information can be delivered to members of a group 'Friends', to members of a group 'Work colleagues' or publicly to any client.

Figure 2:
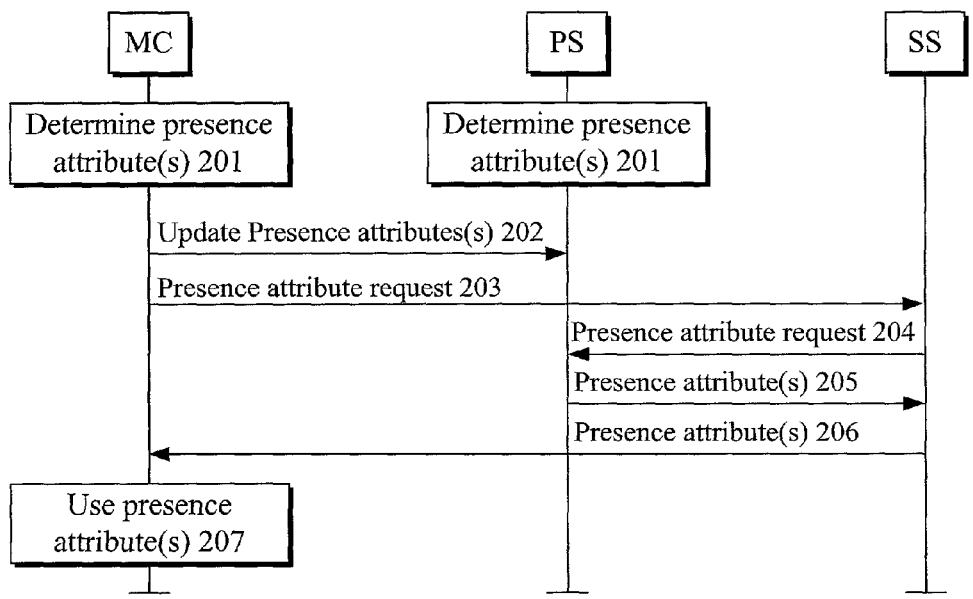
FIG. 2 is a signalling diagram illustrating the transmission of presence attributes.

Various transport layer protocols may be used and the IP protocol is typically used to provide a network layer service. Different lower layer transmission protocols may be used. The mobile network MNW can be any wireless network, such as a cellular network supporting the GSM service, a network supporting also the GPRS service (General Packet Radio Service), a third-generation mobile communication network, such as a UMTS network (Universal Mobile Telecommunications System), a wireless local area network WLAN or a private network. Also short range infrared or radio connections, such as a Bluetooth™ communication, may be used as a part of the communications path between the MC and the server S. The mobile client device MC may be e.g. a mobile station, a PDA device or a laptop computer comprising or being connected to a wireless modem. The mobile IMPS messages may be transferred using a circuit-switched data call, a packet-switched data transmission context, messaging services such as SMS or MMS (Multimedia Messaging Service), for-instance. FIG. 2 illustrates the usage of presence attributes. As the mobile client MC has determined 201 one or more presence attributes to be published, it updates 202 presence attributes to the publisher server PS, i.e. publishes one or more presence attributes. The determination 201 of presence attributes can be done when the client is establishing a logical mobile IMPS session with the mobile IMPS server or automatically or by a user initiative when some presence information has changed. For instance, phase 201 may be initiated automatically at a pre-determined time, data, or by a change of user profile at the mobile client MC. When a client MC (A) accesses mobile IMPS services of a server SS, it may request 203 presence information on another client (B). The subscriber server SS requests 204 this information from the publisher server PS (of client A). The PS sends 205 one or more presence attributes to SS, if this is allowed by the publication preferences (of client B). It is possible that the publication preferences set by client B prevent some part of the requested information from being sent (to client A or in general). The SS may also automatically request 204 presence information on the basis of the user preferences (of A) when the client establishes a logical connection with the service of the SS. The SS forwards 206 the presence attributes to the receiving client MC (A).

The subscriber server SS (and the publication server PS) typically send the client-originated presence attributes towards the client unmodified. However, there may exist a content adaptation mechanism implemented in the server PS. Content adaptation addresses the issue of modifying a presence attribute in such a way that it matches the client capabilities of the receiving client. In addition to the transmission of presence information as a response to a request from a client, it is also possible to push presence information to available clients MC (that are logically connected to the service) according to the publication preferences. The push-type presence notification can be triggered by three mechanisms: when the publisher server receives an update from the publisher client, when the publisher server detects a change in the attribute value or by implementation-specific internal triggers updating the value.

The client MC is thus configured to update one or more presence attributes to the PS, to receive and handle 207 the presence attributes received from the SS and to present presence information obtained from at least one presence attribute to the user. The MC preferably stores presence information (presence attribute values) until new presence attribute values are received in an update message used to carry presence attributes (or the client finishes the mobile IMPS session). Further, as will be illustrated in more detail later, the client device may automatically utilize received presence information to adjust its function accordingly. In addition to the signallings shown in FIG. 2, an authorization may be requested from the publisher of the presence information before sending presence attributes to a requesting client. FIG. 2 does not show any status messages by which the server may respond, e.g. after the message 202.

A client originated presence attribute is one which has its value field filled in by the publishing client. A server originated presence attribute is one which has its value field filled in by the publisher server. A presence attribute is client-server originated when one part of the value field is filled in by the client and the rest by the publisher server. According to a preferred embodiment of the invention, users or organizations may define new presence attributes besides the predetermined set of attributes. The presence attributes can be divided into the following classes:

Client Status: Presence attributes describing the availability of the client device for communication; network reachability, GPRS attached, on/off status, operator, for instance. Thus the attributes in mobile IMPS service are very different than in IMPS used for non-mobile client devices.

User Status: Presence attributes describing the availability of the user for communication; ready, meeting, busy, away, on the phone, chatting, do not disturb, for instance.

Local Information: Presence attributes describing the local environment at the user; local time, noisy/silent environment, in-door, out-door, location of the user, in terms of, for instance, geographical location, visited PLMN, city/street, premises, for instance. For instance, the exact location of the mobile client may be obtained for the local information attribute directly and the availability status (in a meeting, in a summer cottage, etc) may be readily available via user profile settings of the mobile client MC.

Personal Status: Various personal attributes describing personal user status; mood, personal interests and intentions, for instance.

Client Capabilities: Presence attributes describing the capabilities of the client device to support different means of communication, different media types and different features.

User Attributes: Presence attributes allowing the client device or the user to define their own textual presence values and references to external values.

Extended Presence Information: Vendor specific or service provider dynamically defined non-standard presence attributes which however need to be passed through standard presence servers.

Thus there may be different presence attributes for mobile client devices and actual users. For instance, the user may be defined as not being available for receiving messages but the user's client device is defined as being on-line. The user may also be defined to be able to receive messages and not being online if SMS is used as a bearer.

General Structure and Identification of Presence Attributes

Table 1 describes the general structure of presence attributes. A presence attribute generally comprises an identifier part and a plurality of value fields. The Req field determines whether the element is mandatory M, optional O or conditional C. Attribute information is in XML format (Extensible Markup Language).

TABLE 1

Presence Attribute Structure

| Information Element | Req | Type | Description |
|---|---|---|---|
| NameSpec | M | XML | Attribute identity information |
| Value | M | XML | Value for the attribute |

The sub-elements of the Namespec element are described in Table 2.

TABLE 2

The NameSpec element

| NameSpec | Req | Type | Description |
|---|---|---|---|
| Name | M | String | Name of the attribute |
| Qualifier | O | String | Information related to the scope of attribute usage |
| Authority | C | String | The authority responsible for the fact that attribute NameSpec and value field names are unique |

The name of the attribute is a string given by the information element 'Name'. The Name information element is defined for all presence attributes in the format defined in Table 3.

TABLE 3

The Name element

| Information element | Name |
|---|---|
| Data type | String |
| Format | Free text format |
| Description | Name of a presence attribute |

The format of the Qualifier element is illustrated in Table 4.

TABLE 4

The Qualifier element

| Information element | Qualifier |
|---|---|
| Data type | String |
| Format | Free text format |
| Description | Modifies the scope of attribute usage |

The Qualifier element is used to specify the scope of the attribute usage. The qualifier can be used especially for two purposes: to add a new attribute or to enable the sender of presence information (the publisher) to specify how the presence information is to be used in the receiving client device. Thus the qualifier string may be used as a parameter for one or more applications in the receiving client device.

For instance, if the publisher wants to limit the knowledge of his exact location (e.g. the street address) to only some of the users (call it group A) and give a more approximate location (e.g. only a city name) to others (call it group B), he may publish a location attribute with the city name to group B. For group A he attaches a Qualifier (say 'My best friends') to the location attribute. This effectively creates a new attribute with Qualifier 'My best friends'. He then includes the street address in this new attribute and publishes it to group A. As these attributes are different, the server PS is able to keep their values separate. Also if a person belongs to both groups A and B, the client device of this person can be configured to distinguish between these two attributes. The client device may be configured to present (and possibly utilize) the attribute according to the group which the user has activated. The possible Qualifier values may be preassigned by the client and the service provider or they may be assigned dynamically by the user (publisher). A service provider may also limit the number of dynamically assigned Qualifier values.

The authority element determines the body who is responsible for keeping the attribute and its contents unique. This relates to the attribute extension mechanism.

TABLE 5

The Authority element

| Information element | Authority |
|---|---|
| Data type | String |
| Format | URL |
| Description | Identifies the body responsible for the uniqueness of the attribute |

When predetermined presence attributes are used unmodified, the Authority string can be omitted. Use of a Qualifier string is not a modification to the attribute that requires the use of the Authority element. It must be used when introducing a new attribute (a new Name) or when adding a new value field to an already specified attribute. In both of these cases the attribute is considered to be a new one and the Authority is responsible for maintaining this new attribute.

Generally a Value field name must be unique within an attribute. Thus, the introduction of a new value field to an existing attribute must be handled by the rules set by the body who has defined the attribute. Adding a new value field transforms the old attribute into a new one. This must be signalled by the presence of the Authority field in order to allow both the new and the old attribute to co-exist. It is also possible that a stakeholder releases an attribute for public maintenance. This kind of attribute is registered by a proper authority, such as IANA (Internet Assigned Numbers Authority), and also signaled in the Authority field. In this case any stakeholder may register additional value fields for the attribute without having to change the Authority field. The server (PS, SS) does not remove a value field from an attribute even though it would not understand the semantics of the value field. The client MC ignores all the value fields in the attribute that it does not understand.

Figure 3:
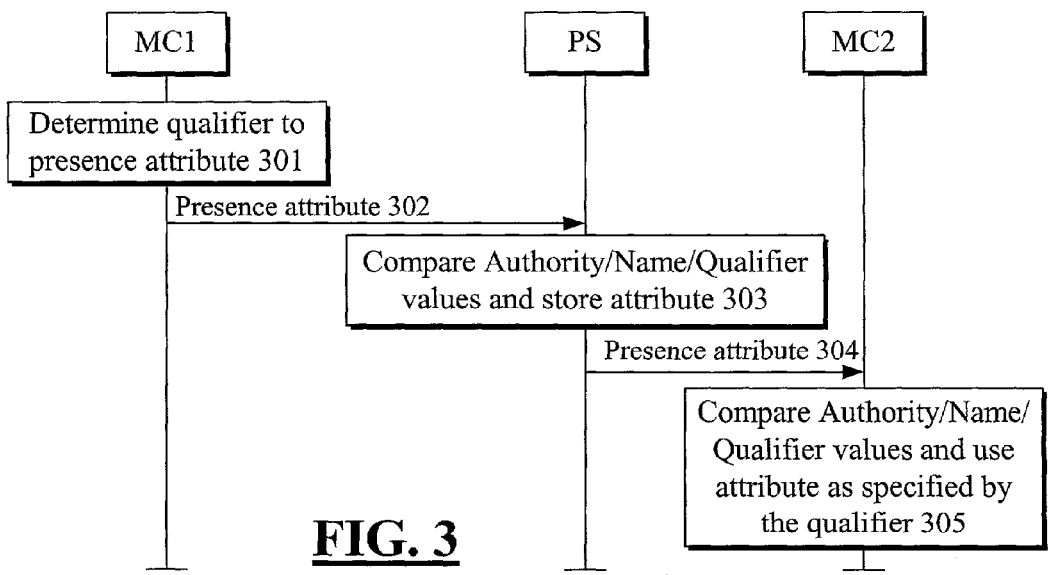
FIG. 3 is a signalling diagram illustrating the usage of a qualifier.

An attribute is identified and made unique by the element NameSpec. FIG. 3 shows an example of the use of the NameSpec element and the qualifier. A qualifier is determined 301 for an attribute in client device MC1. It is possible that the user determines the qualifier or that the client device MC determines it. The qualifier may be defined in order to specify the desired the user group, determine how to present the presence information in a receiving client device (MC2), or otherwise to specify how the receiving client device MC2 should use the attribute. It is possible to utilize the user profiles of the mobile client MC when determining the qualifier. For instance, the MC1 composes presence attribute on the basis of the current profile (e.g. on a meeting), calendar entries (meeting ends at 12.00) and the local time. By using the qualifier, the presence attribute can be easily modified to include a lot of useful information for the receiving client MC2. The attribute is sent 302 to the server PS.

PS compares 303 the NameSpec element of the received attribute to already stored attributes. The PS first compares the Authority strings with each other. An attribute not containing an Authority string is different from any attribute that has an Authority string. Next the attribute names are compared. Finally the Qualifier strings are compared. An attribute that does not contain a Qualifier string is different from any attribute that has a Qualifier string. Two attributes are the same only when all of these three comparisons give the same result. Thus it is possible to functionally separate the received attribute with the qualifier from attributes with same attribute name but with a different qualifier.

The publication server PS does this kind of comparison to determine whether the value fields of the received attribute shall replace some already existing presence information or whether the attribute is a new one to be added to the presence information storage of the MC2. On the basis of the comparison, the PS stores 303 the information in the received attribute. The PS replaces previous presence information of an already stored attribute with the presence information of the received attribute if all identifiers of the received attribute are the same as in already stored attribute. Otherwise the PS adds the presence information of the received attribute without replacing any previous information. PS sends 304 the attribute to at least one client device MC2 (either automatically pushes it or as a response to a request from the MC2). According to an embodiment, the qualifier determines a group to which the attribute is directed. Further, the qualifier may be used to present presence information in different ways for private contacts and public contacts in a phone book, for instance. Thus the PS may determine the receiving client devices on the basis of the qualifier. Service capabilities for a dynamic phone book service will be described later, after first describing the client status attributes, user status attributes and personal status attributes more fully below.

Also the receiving client MC2 decides, after a similar comparison 305 as in PS, whether and how to store the information of the received presence attribute. This kind of ternary identification of presence attributes enables very flexible usage, management and creation of presence attributes.

There are many ways in which the qualifier may be used to specify the usage of the attribute in the client device MC2. Typically the client device MC is capable of supporting a plurality of applications. According to a first embodiment, the client device MC1 adds a qualifier specifying an application to be used. Application refers generally to any application entity which can be identified e.g. by a port number. The application may be the same as used to process the presence information of the attribute in the client device MC1 or another application. The receiving client device MC2 addresses 305 the received attribute to the application indicated by the qualifier. For instance, by using the qualifier, the same presence information may be sent to a phone book application and a game application. These applications may use the presence information differently and thus it is possible also to tailor attributes exactly for application needs.

According to a second embodiment, the client device MC1 adds a qualifier specifying the presentation of the attribute. The receiving client device MC2 presents 305 the received attribute on the basis of the qualifier. The qualifier may determine e.g. whether the information is shown to the user at all or not or which parts of the information are shown. The qualifier may also determine various user interface settings such as colors, fonts etc. Thus the UI of the MC2 is configured 305 on the basis of the settings in the qualifier.

Client Status Attributes

According to a preferred embodiment, the mobile clients MC utilize a presence attribute which describes the current transmission capabilities of a mobile client MC. A structure for this kind of attribute is illustrated in Table 6. This attribute, referred to as a Modem attribute, gives presence information on those user terminal parts or functions that are dealing with mobile bearers.

TABLE 6

Modem Attribute Structure

| Information Element | Req | Type | Value | Description |
|---|---|---|---|---|
| Name Spec. Name | M | String | Modem | Name of the attribute |
| Value | M | XML | See Table 7 below | Value for the attribute. Type is a structure |

TABLE 7

Value fields of Modem attribute

| Modem.Value | Req | Single/Multiple | Description |
|---|---|---|---|
| Status | M | S | Name of the Value field |
| CommAddr | O | S | Name of the Value field |
| CS_Status | O | S | Name of the Value field |
| PS_Status | O | S | Name of the Value field |
| Roaming-Status | O | S | Name of the Value field |
| CS_CallStatus | O | M | Name of the Value field |
| PDP_ContexStatus | O | M | Name of the Value field |

The Status value field as illustrated in Table 8 indicates the status of the mobile modem.

TABLE 8

Status value field of Modem

| Information element | Status |
|---|---|
| Data type | Enumerated String |
| Format | Following values:<br>ON-The modem part of the terminal is powered on<br>OFF-The modem part of the terminal is powered off or out of coverage<br>DIS-The value fields (if any) given by this attribute are invalid. All the value fields obtained from earlier updates are invalid |
| Description | Status field of the modem attribute |
| Range | ON \| OFF \| DIS |

The Status value field indicates whether the modem is turned on or off. According to a preferred embodiment, a presence attribute includes a DIS indication preferably in the mandatory Status value field of the attribute. When DIS is set in an attribute, all values given in the attribute are invalid. The receiving mobile client MC is thus able to ignore the value fields of the attribute. Also previous values of the presence attribute are removed (and nulled). Thus it is practical to send an attribute with DIS indication but no other value fields. This kind of attribute requires very little space and thus critical bandwidth over the radio interface can be saved. This is very useful especially with attributes describing user attributes.

Referring again to Table 7, the CommAddr value field of the Modem attribute includes the communication address of the modem (MC). It contains two parts: the communication means and the contact address. The means part carries information about the supported communication methods, especially whether the modem supports packet-switched (PS) data, circuit-switched (CS) data or voice, SMS or MMS. The Contact part includes the address, e.g. an MSISDN number.

The CS_Status value field indicates the circuit switched status of the modem (registered or not registered). The PS_Status value field indicates the packet switched status of the modem (attached or not attached). The RoamingStatus value field indicates the home PLMN (Public Land Mobile Network) and possibly the PLMN in which the modem is currently roaming. The CS_CallStatus value field gives the in-call status of a CS bearer (data or voice; active or not active). The modem attribute may have a list of these in-call statuses in case if multicall capability is supported by the modem. The PDP_Context Status value field includes information about the PDP (Packet Data Protocol) context, such as QoS (Quality of Service) information.

In addition to above examples, the modem value field may be used to carry other information related to transmission capabilities of the mobile client. In a first example a maximum bit rate of the mobile client is delivered in the Mode attribute. The receiving client device can then configure its transmission rate so that the maximum bit rate is not exceeded. In a second example the client device determines that only the packet-switched transmission mode is to be used when sending data files to the client device. A third example is that a roaming device orders that only certain type of communication is enabled (e.g. only voice calls are allowed and data files shall not be sent).

User Status Attributes

According to one preferred embodiment, an attribute is defined for the willingness of the user to engage in an activity. The activity is specified by the value fields belonging to this Availability attribute. Table 9 illustrates the structure for the Availability attribute.

TABLE 9

Availability Attribute Structure

| Information Element | Req | Type | Value | Description |
|---|---|---|---|---|
| Name Spec. Name | M | String | Availability | Name of the attribute |
| Value | M | XML | See Table 10 below | Value for the attribute. |

Table 10 describes the value fields of the Availability attribute.

TABLE 10

Availability attribute values

| Availability-Extension-Value | Req | Single/Muliple | Description |
|---|---|---|---|
| Status | M | S | Value field name |
| CommAvail | O | S | Value field name |
| PhoneAvail | O | S | Value field name |
| SMSAvail | O | S | Value field name |
| MMSAvail | O | S | Value field name |
| IMAvail | O | S | Value field name |
| EmailAvail | O | S | Value field name |
| Image | O | M | Value field name |
| Text | O | M | Value field name |

The status value field as illustrated in Table 11 indicates the status of availability information.

TABLE 11

Status field

| Information element | Status |
|---|---|
| Data type | An enumerated String |
| Format | One of the following values:<br>ENA-The value fields included in this attribute contain up-to-date information. The value fields updated earlier and not included in this attribute are still up-to-date<br>DIS-The value fields (if any) included in this attribute contain invalid information. The value fields updated earlier are invalid. |
| Description | Defines the publishing status of availability attribute |
| Range | ENA \| DIS |

The Status value field indicates whether the publishing of availability information is enabled or not. The DIS indication may be used as already described to invalidate the values of the Availability attribute. For instance, the server PS may send an availability attribute with DIS indication after the mobile client MC has closed the mobile IMPS session. This kind of message may also be sent when a connection to client is suddenly lost. Thus the receiving mobile client can remove all availability information relating to the user and the client device that are no longer present in the mobile IMPS system.

The CommAvail value field in Table 10 indicates whether the user is willing to engage into any form of remote communication. The PhoneAvail value field indicates whether the user is willing to engage in a telephone call. The SMSAvail value field indicates whether the user is willing to engage in an SMS exchange. The MMSAvail value field indicates whether the user is willing to engage in an MMS (Multimedia Messaging Service) exchange. IMAvail value field indicates whether the user is willing to engage in an IM (Instant Messaging) exchange. The EmailAvail value field indicates whether the user is willing to engage in an EMAIL exchange.

The structure for Image value field is illustrated in Table 12.

TABLE 12

Image

| Image | Req | Description |
|---|---|---|
| ContainedImage | C | An image included in the attribute in transfer encoded form |

TABLE 12-continued

Image

| Image | Req | Description |
|---|---|---|
| ReferredImage | C | A URL to the image |
| Value Field | M | The name of any Value Field in this attribute except Status, Image or Text |

This value field associates an image with any of the value fields in the Availability attribute except in the Status, Text or Image field. The ContainedImage value field includes the image, the size or the format of the image may however be restricted. The ReferredImage value field includes a URL to resource having the associated image. The ValueField value field defines the value field the image is associated with. For instance, the publisher may associate an image with the value field PhoneAvail which currently has value 'DISC' (meaning that the user is limitedly available for telephony, for instance) in order to convey pictorial semantic information about the meaning of DISC. The Image value field may have multiple instances in this attribute. Whenever this value field is included in the attribute, its target value field must also be included in the same attribute. The association is valid only as long as the target value field is valid. When the target value field is updated or invalidated, any old association with this attribute must be discarded by the receiving client.

The structure for Text value field is illustrated in Table 13.

TABLE 13

Text

| Text | Req | Description |
|---|---|---|
| ContainedText | M | A text string |
| Value Field | M | The name of any Value Field in this attribute except Status, Image or Text |

Text value field associates a text string with any of the value fields in the Availability attribute except in the Status, Image or Text field. The Text value field includes the text string in ContainedText and the name of the associated value field in ValueField. The size of the text may be limited in the ContainedText element. For example, the publisher may associate a text with value field PhoneAvail which currently has value 'NAVL' (e.g. 'in meeting until 14:00') in order to convey additional semantic information about the meaning of NAVL. The Text value field may have multiple instances in this attribute, i.e. the same text may be associated with a multiple value fields. Whenever this value field is included in the attribute, its target value field must also be included in the same attribute. The association is valid only as long as the target value field is valid. When the target value field is updated or invalidated any old associations with this value field must be discarded by the receiving client. Images and text may also be automatically added to a presence attribute.

Personal Status Attributes

PersonalStatus attribute indicates the personal status of the publisher. The options and details are specified by the value fields belonging to this attribute. Table 14 illustrates attribute structure for the PersonalStatus.

TABLE 14

PersonalStatus attribute structure

| Information Element | Req | Type | Value | Description |
|---|---|---|---|---|
| Name-Spec.Name | M | String | Personal-Status | Name of the attribute |
| Value | M | XML | See Table 15 below | Value for the attribute |

PersonalStatus attribute values

| Personal-Status.Value | Req | Single/Multiple | Description |
|---|---|---|---|
| Status | M | S | Name of the value field |
| Text | O | S | Name of the value field |
| Mood | O | S | Name of the value field |
| Time | O | S | Name of the value field |
| Image | O | M | Name of the value field |

Table 15 illustrates the value fields of the PersonalStatus attribute.

The status value field as illustrated in Table 15 indicates the status of PersonalStatus information.

TABLE 15

Status of PersonalStatus attribute

| Information element | Status |
|---|---|
| Data type | An enumerated String |
| Format | One of the following values:<br>ENA-The value fields included in this attribute contain up-to-date information. The value fields updated earlier and not included in this attribute are still up-to-date<br>DIS-The value fields (if any) included in this attribute contain invalid information. The value fields updated earlier are invalid. |
| Description | Defines the publishing status of location attribute |
| Range | ENA | DIS |

This field indicates whether the publishing of this information is enabled or not. The DIS indication may also be used with the PersonalStatus attribute.

The Text value field indicates the status of the publisher in a free text form. The Mood value field indicates the mood of the publisher. The Time value field gives the local time of the publisher.

According to a preferred embodiment, an image may also be utilized in the PersonalStatus attribute. As already illustrated in Table 12 the Image value field associates an image with any of the value fields in this attribute except in the Status or Image field. For instance, the publisher may associate an image with value field Mood which currently has value 'IN_LOVE' in order to convey pictorial semantic info about the meaning of IN_LOVE. The Image value field may be used in a similar way as already illustrated with attribute Availability.

The present invention can be implemented in the existing client devices and servers. They all have processors and memory with which the inventive functionality described above may be implemented. A computer program may be loaded from an internal or external memory to the processor of the server or the client device, causing, when executed in the processor, the means to implement the inventive functionality. Also hardware implementation or a combination of software and hardware implementation may be used.

Figure 4:
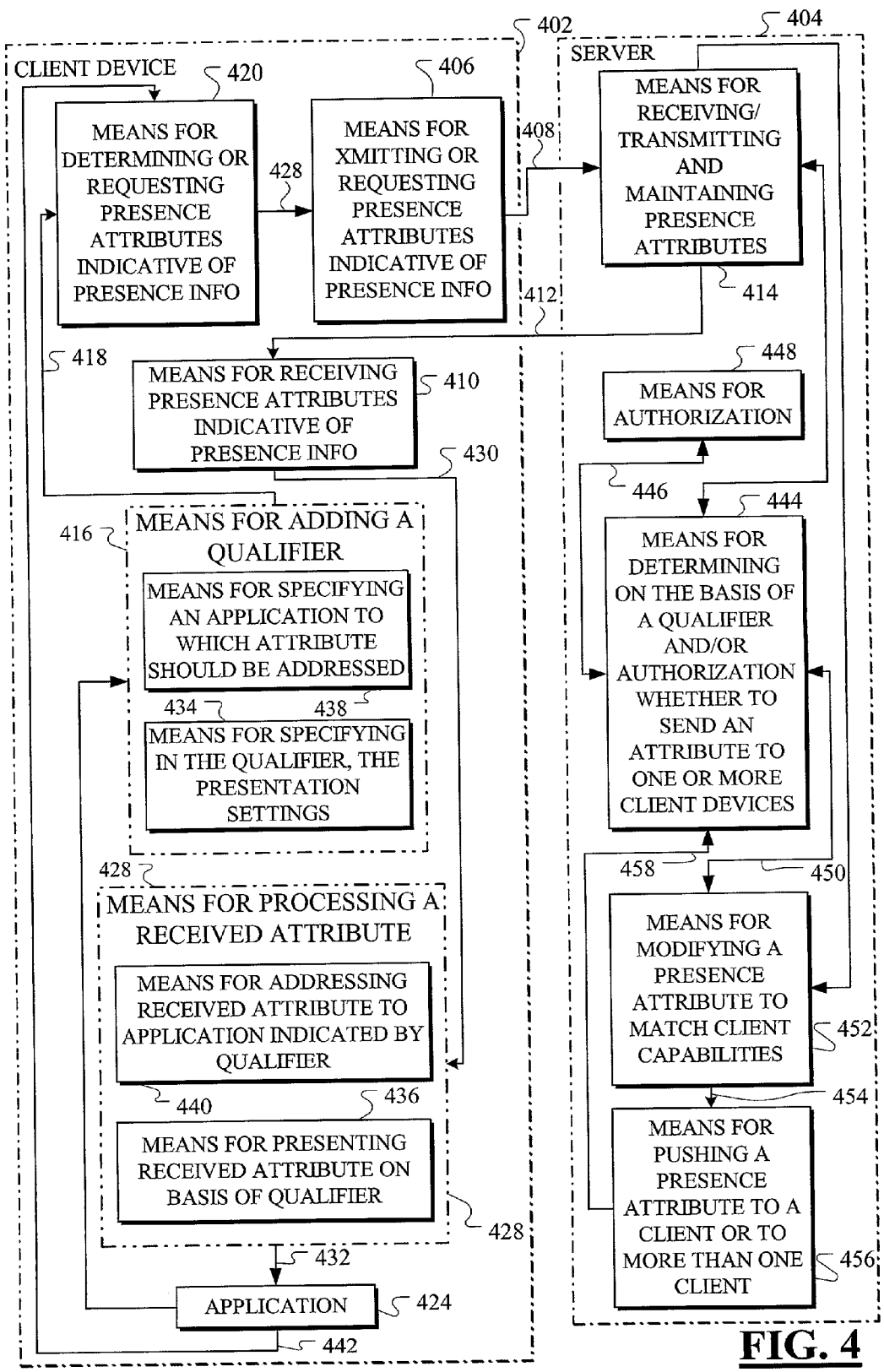
FIG. 4 shows one embodiment of a mobile messaging system comprising at least one client device and a server, according to the present invention.

FIG. 4 shows a client device 402 in communication with a server 404, according to the present invention. The client device may be similar to one or more of the mobile clients or the non-mobile client of FIG. 1 or any of the other mobile clients shown in FIGS. 2 and 3. Likewise, the server 404 may be similar to the server shown in FIG. 1 or any of the other servers shown in FIGS. 2 and 3. The client device 402 includes means 406 for transmitting or requesting presence information as presence attributes to the server on a signal line 408. Transmitting presence information would correspond for instance to the step 302 of FIG. 3 in which presence attributes are sent from MC1 to PS or the step 202 of FIG. 2 in which presence attribute(s) are updated by the MC and sent to the PS. Requesting presence information on the line 408 would be comparable to the request step 203 of FIG. 2 wherein the MC requests a presence attribute from the SS. The transmission on the line 408 from the client device 402 to the server 404 could be similar to the transmission path shown in FIG. 1 from a mobile client (MC) through a mobile network (MNW) via an intermediary network ONW to the IMPS server(s). Or, it could be similar to the path from the non-mobile client C through the intermediary network ONW to the server S. Of course other possible paths are contemplated as well and the invention does not depend on the path of the physical media or combination of physical media used. The client device 402 also includes means 410 for receiving presence attributes from the server 404 on a signal line 412. Such presence information is categorized by a plurality of presence attribute types identified by attribute name.

The server 404 includes means 414 for receiving/transmitting attributes and for maintaining presence information based on the received presence attributes.

According to the invention, the client device 402 additionally includes means 416 for adding a qualifier to a presence attribute wherein the qualifier comprises one or more parameters specifying the use of the attribute. The added qualifier is provided on a signal line 418 for transmission by the means 406 on the line 408 to the server 404. This may be done via a means 420 for determining presence attributes in accordance with instructions received on a line 422 from an application 424. The application can also utilize the means 420 for requesting presence attributes. In either event, a signal may be provided on a line 426 from the means 420 to the means 406 for transmitting or requesting presence attributes on the line 408. In case the means 416 has added a qualifier, for instance in updating a presence attribute as per step 202 of FIG. 2, the signal on the line 408 will include a presence attribute with a qualifier having one or more parameters specifying use of the attribute.

For handling presence attributes incoming on the line 412 from the server 404, the client device 402 will also include means 428 for processing a received presence attribute on the line 412 from the server 404 according to qualifier parameters in the received attribute. The received presence attribute on the line 412 may be received by the means 410 and provided on a line 430 to the means 428 for processing the received attribute. After processing, the means 428 may provide a signal on a line 432 to the application 424 for further use by the application.

The means for adding a qualifier 416 may include means 434 for specifying in the qualifier presentation settings of the attribute so that the client receiving the attribute from the server 404 will be able to present the attribute on the basis of the presentation settings. Consequently, a client device such as the client device 402 of FIG. 4 will include means 436 for presenting received attributes on the basis of such a qualifier specified by another client device and received from the server 404 on the line 412.

Likewise, the means 416 may include a means 438 for specifying in the qualifier to be sent to the server 404 an application to which the attribute should be addressed in the receiving client. For such a client device 402 receiving a qualifier specifying the application to which the attribute should be addressed, it will have means 440 for interpreting such an attribute received on the line 430 for addressing a received attribute to the application indicated by the qualifier.

Turning now to the server 404 in more detail, it may also include means 444 for determining on the basis of a qualifier whether to send an attribute to one or more client devices such as specified by a presence group in a presence database in the server. Such a determination may also depend on an authorization provided on a line 446 from a means 448 for providing such authorization. If the qualifier and authorization indicate that the attribute should be sent to one or more client devices, then the server 404 will do so, for instance to the client device 402 as well as similar devices, if appropriate.

It may be that a presence attribute intended for a particular client may not match that client's capabilities, according to information known to the server. Such information may be provided for instance by the means 444 on a line 450 to a means 452 for modifying the presence attribute to match the client's capabilities. The modified attribute may be provided back to the means 444 on the line 450. On the other hand, in cases where presence attributes are provided according to a "push" technology, the modified presence attribute may be provided on a line 454 to a means 456 which is capable of taking the appropriate steps to push the modified presence attribute to the client or to more than one client, as appropriate. This may be signalled for instance on a line 458 to the means 444.

It should be realized that the functional blocks shown in FIG. 4 may be carried out using discrete hardware, specialized integrated circuits, microcontrollers, software, firmware, etc., as will be apparent to those of skill in the art. Moreover, the functions attributed to distinct functional blocks in the figure need not be separate but can be incorporated in other blocks by free addition or subtraction of functions into or from other functional blocks. Likewise, the cooperative relationships between the functional blocks may be modified in their order and interrelationships while at the same time carrying out the same end results mentioned above. It should also be realized that the details of the client device and server device shown in FIG. 4 can take other forms which are similar to those shown, according to the invention. Other aspects of the invention can be illustrated in a similar but by no means identical way.

Figure 5:
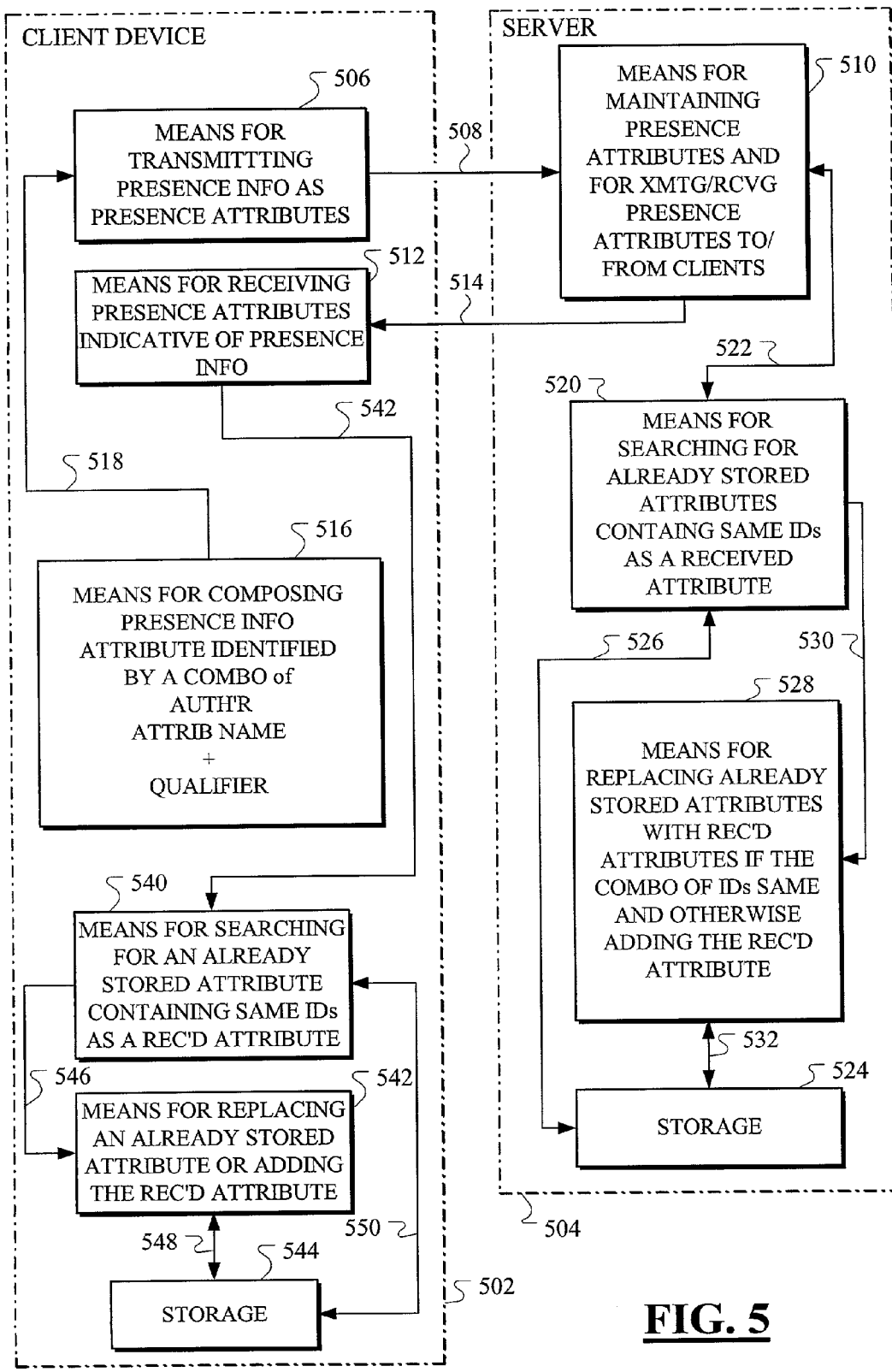
FIG. 5 shows another embodiment of a mobile messaging system comprising at least one client device and a server, according to the present invention.

For instance, FIG. 5 shows a client device 502 communicating with a server device 504 with means 506 similar to the means 420 of FIG. 4 for transmitting presence information as presence attributes on a line 508 to a means 510 for receiving and maintaining presence attributes within the server 504, similar to the means 414 within the server 404 of FIG. 4. Likewise, the client device 502 may include means 512 for receiving presence attributes indicative of presence information on a line 514 from the means 510 of the server 504. Similar to the means 420 and 416 of the client device 402 of FIG. 4, the client device 502 of FIG. 5 may include means 516 for composing a presence information attribute identified by a combination of an authorizer, an attribute name and a qualifier, the authorizer specifying a body responsible for maintaining the attribute and the qualifier specifying the use of the attribute. The so-composed attribute may be provided on a line 518 to the means 506 for transmittal on the line 508 to the server 504, as shown. The server 504 may include means 520 that is responsive to the so-composed attribute received on a line 522 from the means 510 for searching for already stored attributes containing the same combination of authorization, attribute name and qualifier. If the combination of identifiers of the received attribute is identical to that of the already stored attribute, for instance stored in a storage means 524, the received attribute is used to replace the already stored attribute over a signal line 526. In this way, if the attribute parameters have changed, the updated parameters will be stored in the storage means 524. Otherwise, the received attribute is added to the storage means as a new attribute. This function may be carried out in the means 520 as described above, or may be carried out in a completely separate means 528 which receives the received attribute on a line 530 from the means 520 and includes functions for replacing the already stored attributes with the received attributes if the combination of identifiers are the same and otherwise adding the received attribute over a connection line 532 between itself and the storage means 524.

The client device 502 will include similar functionalities as just described above as shown for instance by a means 540 which receives incoming attributes on a line 542 from the means 512 and searches for already stored attributes containing the same identifiers as the received attribute and means 542 for replacing the already stored attribute with the received attribute if the combination of identifiers of the received attribute is identical to that of the already stored attribute. Otherwise, the received attribute is added to a storage means 544. The means 540 for searching may include the means 542 within or they may be separate as shown in the figure. In the latter case, a signal line 546 provides attribute information concerning the received attribute from the means 540 to the means 542. The storage means 544 may be in bidirectional communication over line 548 with the means 542 for replacing or adding attributes and the line 550 with the means 540 for searching for already stored attributes.

Figure 6:
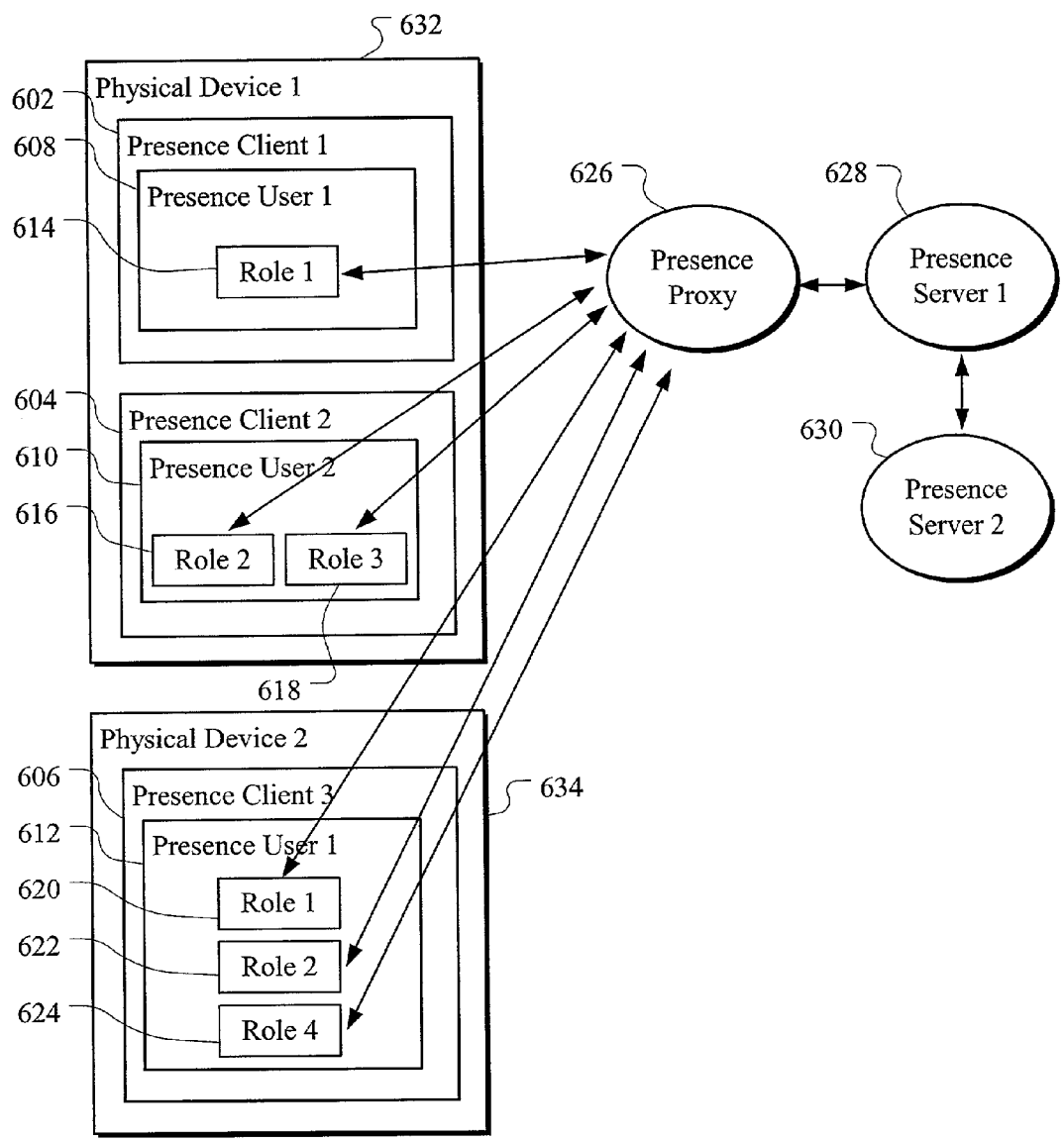
FIG. 6 shows a presence framework, according to the present invention.

As mentioned above, the service capabilities for a dynamic phonebook service embodiment of the present invention will now be described. A dynamic phonebook service can be viewed as a rich call service. It is useful "before the call" to enrich cases where B party's presence information is shown to the A party. In this case, the B party is one or more of the user phonebook entries. The presence information can be divided into the same categories as mentioned above, i.e., (1) client availability, (2) user availability, (3) local conditions, (4) personal status, (5) client capabilities, (6) user attributes, and (7) extended presence service:

Conceptually, the Presence System consists of Presence Clients 602, 604, 606, Presence Users 608, 610, 612, Presence User Roles 614, 616, 618, 620, 622, 624, Presence Proxies 626 and Presence Servers 628, 630, as shown in FIG. 6. A Presence Client is the software or program which enables for the user an interaction with the Presence System. The User is a person who interacts with the Presence System using the Presence Client. A physical device 632, 634, e.g., mobile handset or PC, may have one 606, or in special cases, multiple presence client instances 602, 604. A presence client is owned by a single user. A user may own more than one client but then these clients are typically in different devices.

Users 608, 610, 612 are conceptually classified in Publishers and Subscribers. A publisher is the originator of presence information. A subscriber is the receiver of presence information. A User may be both publisher of own presence information and subscriber of some other publisher's presence information at the same time. A user may have one or more Roles. A publisher role is associated with a set of presence values called Presence Set. The presence values of two different presence sets of the same user are independent of each other and are associated with different roles. A subscriber role is the logical receiver of presence information of identical publisher role i.e. of the same presence set.

A Presence Proxy 626 is an optional network element that improves the scalability of the Presence Service. A proxy temporarily stores presence values of different presence sets traveling uplink from the publisher to the server or downlink from the server to a subscriber. When a client comes on-line the proxy may update the client with current presence information. Also when a publisher sends a new presence value to the server the proxy may update all the subscriber clients that are registered with the proxy. A proxy can cache the presence values only temporarily. Even when the presence info is coming from the publisher the proxy cannot assume that all the updates of this presence info is taking place via the same proxy. If the proxy is not aware of the subscriber group associated with a presence set then the proxy may ask for this information from the server.

A presence Server 628, 630 is a network element that maintains valid presence values and information on groups that are associated with each presence set. The server communicates with presence clients either directly or through a proxy. The server informs the proxy about the validity period of presence values cached by the proxy. When the validity period expires the proxy must either discard the values or refresh them from the server. The server assigns the validity periods presence item by item basis by monitoring how frequently the presence values change. The validity period is dynamic i.e. it may change during the lifetime of the presence item.

A presence server exchanges presence information also with other presence servers, as shown in FIG. 6. For instance, if the publisher and subscriber belong administratively to different presence servers then the presence info must go through both servers. In case the servers are incompatible there needs to be a gateway function on one or both servers.

Figure 7:
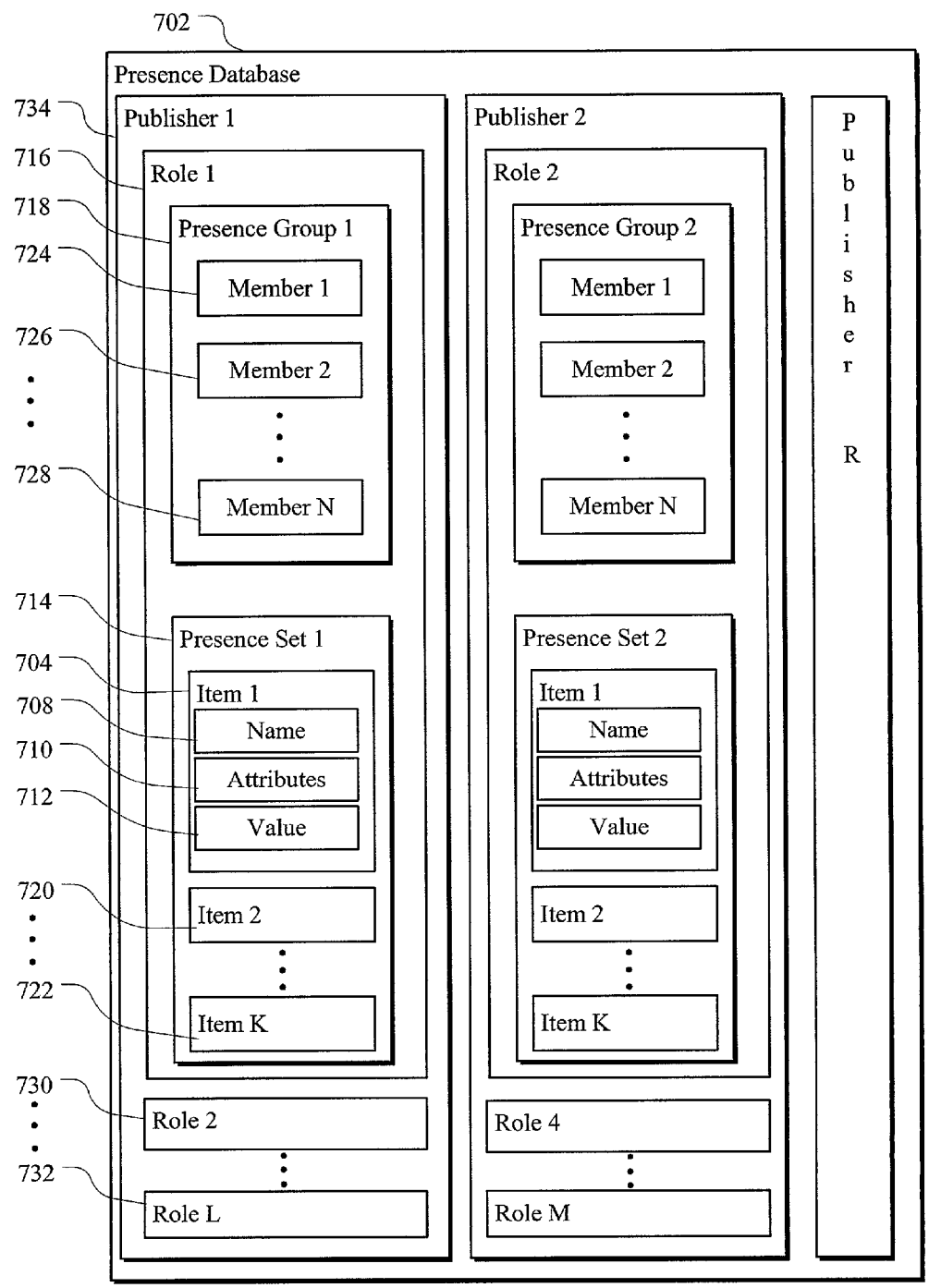
FIG. 7 shows a presence database, according to the present invention.

FIG. 7 shows the structure of a presence database 702, according to the invention. A single presence item 704 has three properties: name 708, attributes 710 and value 712. A presence set 714 consists of a single or more presence items. The presence set 714 belongs to a single role 716 of the user. There cannot be more than one presence set for a single role. In addition there is a single authorization group 718 that belongs to a single role 716. The authorization group consists of members that have the right to subscribe the whole or a part of the presence set of the same role.

The items 704, 720, . . . , 722 in a presence set are unique i.e they can be distinguished from each other. The items are primarily distinguished from each other by their name. In case the presence set contains two or more items with the same name then there must be an attribute in each item that carries the id's of these items. The members 724, 726, . . . , 728 of a group 718 are unique. Different presence sets in different roles 716, 730, . . . , 732 of the same publisher 734 may contain items with the same name or id. Different groups may likewise contain the same members.

A role 716 may be identified by a Role ID, Group ID or Presence Set ID. For instance, the Group ID may be assigned by the service provider and is unique within the service providers domain. Therefore, the following ID's would be needed to address individual elements in the presence database:

GroupID, ItemName

In case the presence set contains more than one item with the same name the ItemName must have the ItemID attribute assigned.

Note that ID's such as UserID, DeviceID and ClientID are not needed.

A. Exemplary Presence Protocol

Figure 8:
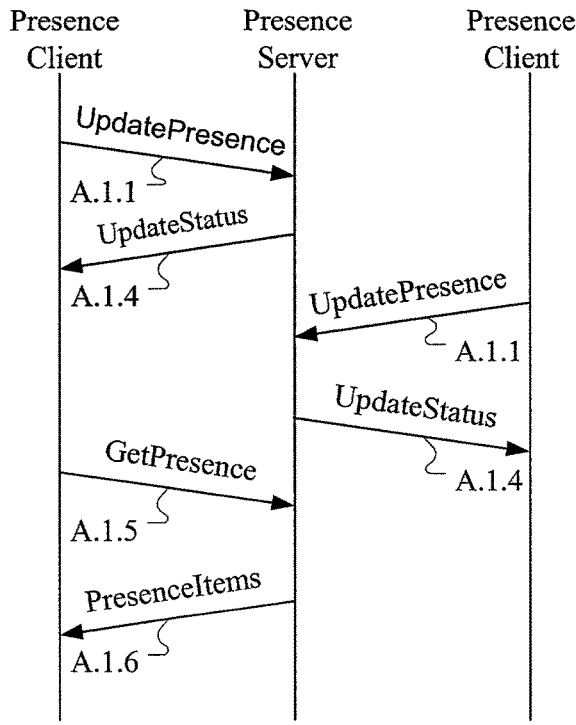
FIG. 8 shows flow diagrams of unsubscribed presence, according to the present invention.

A.1.0 Unsubscribed Presence (FIG. 8)

Figure 9:
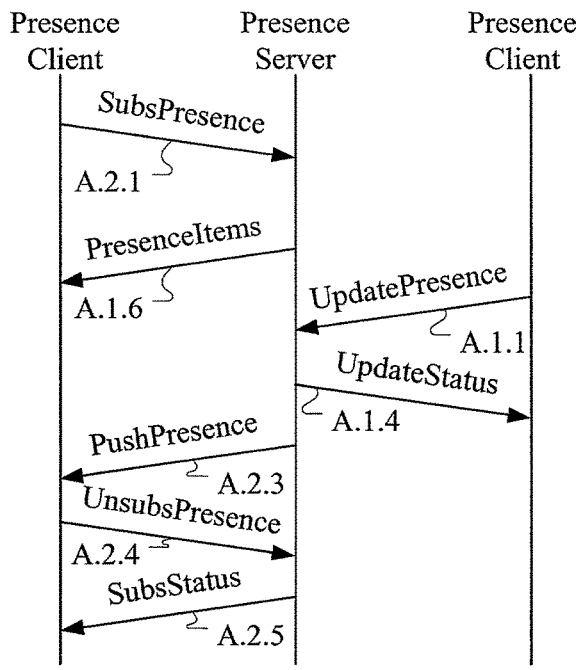
FIG. 9 shows subscribed delivery of presence information, according to the present invention.
Figure 10:
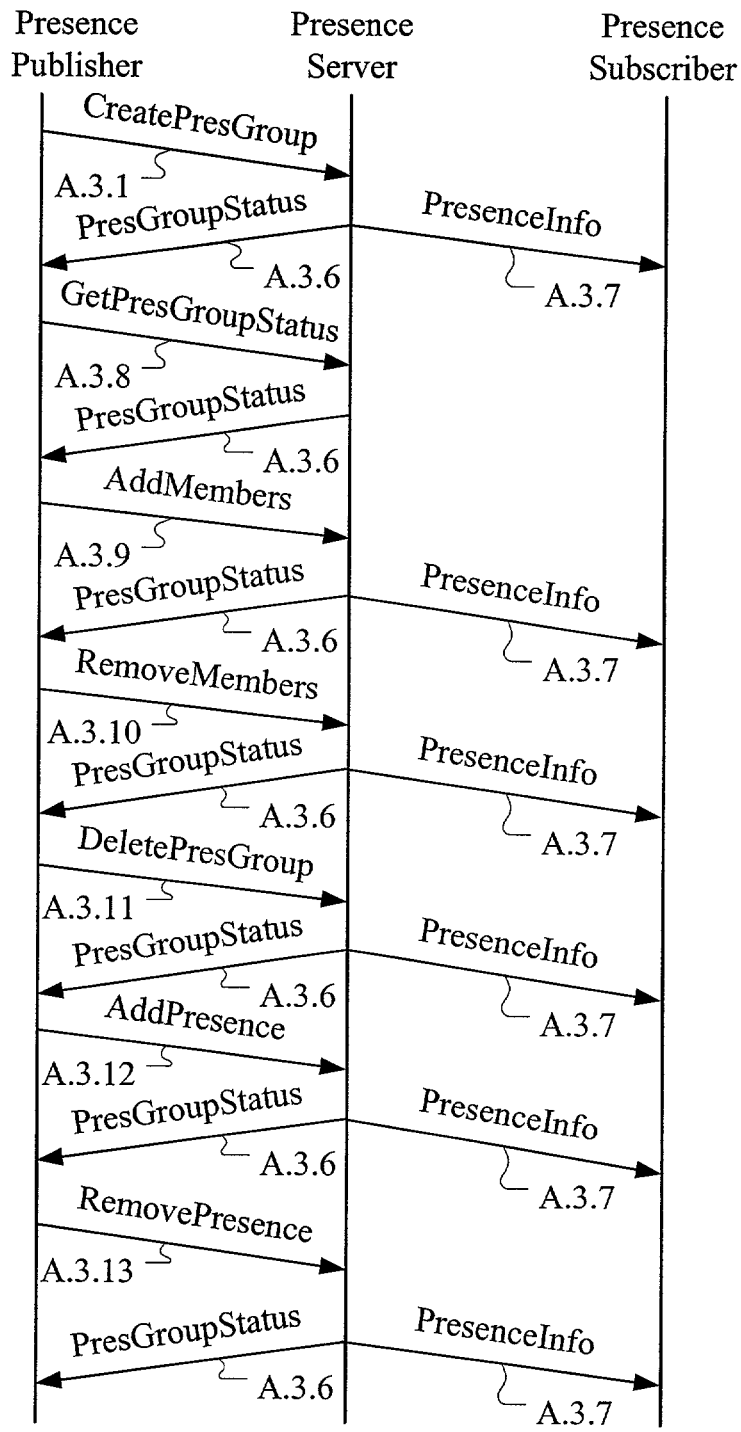
FIG. 10 shows management of user groups and presence sets, according to the present invention.

The presence information of a user can be obtained separately from messaging services by issuing a query to the presence server, as indicated for instance in the message flows presented in steps 203, 204, 205, 206 of FIG. 2, or by subscribing and receiving presence items as in FIG. 9, or by getting presence items as shown in FIG. 8.

The user of a presence service may, at any suitable time, update his presence information in the presence server by sending update presence message as shown in FIG. 8. As mentioned, a user may issue a get presence message to request the presence information of some other user as also shown in FIG. 8. The presence information is delivered back to the requesting user.

The publisher may update his presence information only partially. Similarly, the user may request only partial presence information.

If the user does not have authorization for a requested presence information an empty content is sent to the user.

The authorization of presence information for a given user is done by including the user into the group corresponding to the presence set. This is described below in the part labeled 'Management of presence database'.

A. 1.1 UpdatePresence

Direction: Presence Client→Presence Server

Content Model: (TransactionID, GroupID, Presence)

Attributes: None

Usage: This primitive updates the values of one or more presence items on the presence server. The presence items to be updated are carried in the information element Presence. If there are items in the Presence that do not exist in the server for the given GroupID then the server allocates storage for these new items and copies the contents from this message. Otherwise the server replaces the old value with the new value.

No UserID or PublisherID is needed in the content. The association between the publisher and the XML-document containing the UpdatePresence primitive is made in the authentication protocol.

A.1.2 TransactionID

Content Model: (#PCDATA)

Attributes: None

Usage: This is a unique identifier that associates the request from client to server with the corresponding response from server to client. The client may have sent more than one request to the server before it gets the first response back. The first response does not necessarily refer to the first request. Therefore there needs to be a mechanism that associates requests and responses together. Typically a TransactionID is a sequence number. It is assigned by the client in the request and used by the server in the response.

A.1.3 GroupID
  Content Model: (#PCDATA)
  Attributes: None
  Usage: This id uniquely identifies within the service provider domain the publisher role including the authorization group and presence set. It is assigned by the presence service provider.
A.1.4 UpdateStatus
  Direction: Presence Server→Presence Client
  Content Model: (TransactionID, StatusCode)
  Attributes: None
  Usage: This primitive is the response from the presence server to the client UpdatePresence request. The StatusCode may have following values: not supported, new allocation, success, failure.
A.1.5 GetPresence
  Direction: Presence Client→Presence Server
  Content Model: (TransactionID, ((GroupID, PresenceNames?)*|PresenceNames?)
  Attributes: None
  Usage: This primitive is used to request presence information from the presence server. There may be zero or more GroupIDs. For each GroupID there may be coupled an optional PresenceNames. When the GroupID is not used then the request scope is all the groups the user is a member. The server associates the requesting user's identity to the request by the authentication protocol. The PresenceNames is defined later in this document. It lists those presence items by name from which the value is requested. It is optional. It is either coupled with GroupIDs or may be alone when no GroupIDs are listed. When coupled with GroupIDs the server limits the search of the presence items for the given group. When not present the values of all presence items is requested.
A.1.6 PresenceItems
  Direction: Presence Server→Presence Client
  Content Model: (TransactionID, StatusCode, (GroupID, Presence)*)
  Attributes: None
  Usage: This primitive supplies the list of presence items requested and the result status of the request. The element Presence is the presence set corresponding to a given GroupID and is defined later in this document. The StatusCode may have following values: not authorised, item not available, success, failure.
A.2.0 Subscribed Presence (FIG. 9)
  Another mechanism to deliver presence information is to subscribe someone's presence information. The message flow is presented in FIG. 9.
  The requesting user sends a subscribe presence message A.2.1 to the presence server to subscribe someones presence information.
  When the subscription of presence information is complete, the requesting user will receive new presence information A.2.2 initially and always when the other party updates its presence information.
  When the requesting user does not any more want to receive the presence information, he may unsubscribe A.2 the presence information. Alternatively, the presence information may be subscribed to a time period and the unsubscribe message is not needed.
  The requesting user may subscribe only part of the presence information that he is authorised to get.
A.2.1 SubsPresence
  Direction: Presence Client→Presence Server
  Content Model: (TransactionID, SubsPeriod?, ((GroupID, PresenceNames?)*|PresenceNames?)
  Attributes: None
  Usage: This primitive is used to subscribe presence information from publisher roles for which the subscriber is authorised. The optional GroupID specifies the publisher role which is subscribed. When the GroupID is missing then all the roles for which the subscriber is authorised are subscribed. Each GroupID may be associated with a PresenceNames which limits the subscribed items within the group to those listed in the PresenceNames. The optional SubsPeriod specifies the length in time for the subscription. When it is missing the subscription lasts until an corresponding UnsubsPresence primitive is invoked or until the service provider terminates subscription. The PresenceNames specifies the presence items that are subscribed from the authorised set. When it is missing then all the presence items that the user is authorised for within the presence set (GroupID) are subscribed. When used alone without a GroupID then the named items from all authorised groups are subscribed. PresenceNames is defined later in this document.
  The identity of the subscriber is discovered in the authentication protocol.
A.2.2 SubsPeriod
  Content Model: (#PCDATA)
  Attributes: None
  Usage: This defines the length of the subscription period. The time unit is TBD. Alternatively the content may indicate the date when the subscription ends.
A.2.3 PushPresence
  Direction: Presence Server→Presence Client
  Content Model: (GroupID, Presence)+
  Attributes: None
  Usage: This primitive pushes the subscribed presence items that have been modified by the publisher to the users. The GroupID identifies the role.
A.2.4 UnsubsPresence
  Direction: Presence Client→Presence Server
  Content Model: (TransactionID, ((GroupID, PresenceNames?)*|PresenceNames?)
  Attributes: None
  Usage: This primitive is used to unsubscribe presence information. The termination of subscription may be limited to given groups and can further be limited to given presence items. When no GroupID is given it is possible to limit the subscription termination for the named presence items in all the groups. When no GroupID and no PresenceNames is given then the whole subscription of the user is terminated.
A.2.5 SubsStatus
  Direction: Presence Server→Presence Client
  Content Model: (TransactionID, StatusCode, (GroupID, Presence-Names)*)
  Attributes: None
  Usage: This primitive returns the StatusCode for the unsubscribe operation and lists the presence items and groups that are still subscribed. The StatusCode may have following values: not supported, non-existent item, non-subscribed item, success, failure.
A.3.0. Management of Presence Database
  The presence user may manage his user groups and presence sets in the presence server.
  A role containing a user group and presence set is created using CreatePresGroup message A.3.1. The presence server will reply with PresGroupStatus message A.3.6 indicating the status of the requested operation and an id for the created group. A PresenceInfo message A.3.7 is sent to members of the group indicating the presence items they are authorised to get or subscribe.

The presence user may request group info with the GetPresGroupStatus message A.3.8. The group info request is limited to the owner of the group.

The presence user owning the user group may add and delete members of the group or presence items for the presence set.

The publisher may send delete a group by message DeletePresGroup.

A.3.1 CreatePresGroup
  Direction: Presence Client→Presence Server
  Content Model: (TransactionID, MemberList, Presence)
  Attributes: None
  Usage: This primitive requests the server to create a role in the presence server. The authorization group contains the members in the memberlist and the presence set is contained in Presence.

A.3.2 MemberList
  Content Model: (MemberDescription)+
  Attributes: None
  Usage: The list of members. The description is originated from the user.

A.3.3 MemberDescription
  Content Model: (UserOriginatedMD?, ServerOriginatedMD?)
  Attributes: None
  Usage: The user originated part is a description of a member as seen by the user. The server originated part is a description of a member as stored in the server database.

A.3.4 UserOriginatedMD
  Content Model: (#PCDATA)
  Attributes: None
  Usage: This is a user originated means to identify a person. It may be a name, an MSISDN of one of the phones of the target person, an email address, a SIP address etc. It may also be a combination of these. The dataformat of the description is not within the scope of this document but known formats such as vCard should be used.

A.3.5 ServerOriginatedMD
  Content Model: (#PCDATA)
  Attributes: None
  Usage: This is a server originated means to identify a person. It may be a name, an MSISDN of one of the phones of the target person, an email address, a SIP address etc. It may also be a combination of these as stored in the server database. The dataformat of the description is not within the scope of this document but known formats such as vCard should be used.

A.3.6 PresGroupStatus
  Direction: Presence Server→Presence Client
  Content Model: (TransactionID, StatusCode, (GroupID, MemberList, PresenceNames)*)
  Attributes: None
  Usage: This primitive returns the GroupID's of the currently existing publisher roles together with the group members and presence item names for the role. The server has assigned a new GroupID for the new role if the operation was successful. The server has filled the server originated part of the memberlist. This allows the publisher to verify that the group contains the right members. The server should not give any confidential or personal information in the memberlist beyond the level already existing in the user originated part or a level that is needed to uniquely identify a person. This is TBD. The StatusCode may get following values: not supported, unknown member, unknown presence item, success, failure.

A.3.7 PresenceInfo
  Direction: Presence Server→Presence Client
  Content Model: (GroupID, Presence?)+
  Attributes: None
  Usage: This primitive advertises the new presence items to the authorization group. The message contains all the presence items of the given authorization group—both subscribed and unsubscribed. This message is sent to new members in the group if the group membership has changed or to all the members of the group if new presence items have been added. The message is sent to removed group members so that there is no presence set (Presence) associated with the GroupID.

A.3.8 GetPresGroupStatus
  Direction: Presence Client→Presence Server
  Content Model: (TransactionID, GroupID*)
  Attributes: None
  Usage: This primitive requests the PresGroupStatus message from the server. The user may only request info from his own groups. The GroupID limits the info to the given groups. When no GroupID exist then the status is returned from all the groups owned by the requestor.

A.3.9 AddMembers
  Direction: Presence Client→Presence Server
  Content Model: (TransactionID, (GroupID, MemberList)+)
  Attributes: None
  Usage: This primitive requests the server to add the named members into given groups.

A.3.10 RemoveMembers
  Direction: Presence Client→Presence Server
  Content Model: (TransactionID, (GroupID, MemberList)+)
  Attributes: None
  Usage: This primitive requests the server to remove the named members from the given groups. The MemberList is filled with the server originated info.

A.3.11 DeletePresGroup
  Direction: Presence Client→Presence Server
  Content Model: (TransactionID, GroupID*)
  Attributes: None
  Usage: This primitive requests the server to remove one or more of the publisher roles. The GroupID identifies the role that is to be removed. When no GroupID is given then all the publisher roles are removed.

A.3.12 AddPresence
  Direction: Presence Client→Presence Server
  Content Model: (TransactionID, (GroupID, Presence)+)
  Attributes: None
  Usage: This primitive requests the server to add given presence items into given roles.

A.3.13 RemovePresence
  Direction: Presence Client→Presence Server
  Content Model: (TransactionID, (GroupID, Presence?)+)
  Attributes: None
  Usage: This primitive requests the server to remove given presence items from the given roles. When there is no Presence element associated with GroupID then all the presence items are removed from the role.

A.3.14 Dynamic Client Change
  A publisher or subscriber may change his client at any time. Typically also the client device changes. In a rare case the user may only change the client instance in the same device. The new device may be a TE and the old a MT or vice versa. Also change to a new MT is possible. The client change requires the user to copy or synchronize his presence data from the old client to the new client. In case of a publisher there might be some client specific presence data that is static for a given client and is not included in the synchronisation set. The synchronisation may take place locally or may be network assisted. In any case the existing synchronisation protocols should be used. This is not within the scope of the presence protocol.

Another issue brought by the subscriber client change is the registry of the new client to be the active client that receives the presence related push messages. The registry may take place automatically (no user confirmation needed), semi-automatically (user confirmation required) or manually (user must initiate the registry) depending whether User activates a new client in the same device (automatic);
User SIM changes to the new device (automatic);
User has a different SIM in the new device but only the new device is turned on (semi-automatic); or
User has a different SIM in the new device and both the new device and old device are on (manual).

In all the cases the registry may be handled by lower level protocols. For example if the SIP-protocol is the chosen transport protocol for presence documents then this protocol can also be used for the registry.

A.4.0 DTD for the Presence Protocol

```
<!--Root element-->
<!ELEMENT PresProtocol (UpdatePresence|UpdateSta-
    tus|GetPresence|PresenceItems|SubsPresence|Push-
    Presence|UnsubsPrecence|SubsStatus|CreatePres-
    Group|PresGroupStatus|PresenceInfo|GetPres-
    GroupStatus|AddMembers|RemoveMembers-
    |DeletePresGroup|AddPresence|RemovePresence)>
<!ATTLIST PresProtocol Version NMTOKENS
    #REQUIRED>
<!ELEMENT UpdatePresence (TransactionID, GroupID,
    Presence)>
<!ELEMENT TransactionID (#PCDATA)>
<!ELEMENT GroupID (#PCDATA)>
<!ELEMENT Presence (#PCDATA)>
<!ELEMENT UpdateStatus (TransactionID, Status-
    Code)>
<!ELEMENT StatusCode (#PCDATA)>
<!ELEMENT GetPresence (TransactionID, ((GroupID,
    PresenceNames?)*)|PresenceNames?)>
<!ELEMENT PresenceNames (#PCDATA)>
<!ELEMENT PresenceItems (TransactionID, Status-
    Code, (GroupID, Presence)*)>
<!ELEMENT SubsPresence (TransactionID, SubsPe-
    riod?, ((GroupID, PresenceNames?)*)|Presence-
    Names?)>
<!ELEMENT SubsPeriod (#PCDATA)>
<!ELEMENT PushPresence ((GroupID, Presence)+)>
<!ELEMENT UnsubsPresence (TransactionID,
    ((GroupID, PresenceNames?)*)|PresenceNames?)>
<!ELEMENT SubsStatus (TransactionID, StatusCode,
    (GroupID, PresenceNames)*)>
<!ELEMENT CreatePresGroup (TransactionID, Mem-
    berList, Presence)>
<!ELEMENT MemberList ((MemberDescription)+)>
<!ELEMENT MemberDescription (UserOriginatedMD?,
    ServerOriginatedMD?)>
<!ELEMENT UserOriginatedMD (#PCDATA)>
<!ELEMENT ServerOriginatedMD (#PCDATA)>
<!ELEMENT PresGroupStatus (TransactionID, Status-
    Code, (GroupID, MemberList, PresenceNames)*)>
<!ELEMENT PresenceInfo ((GroupID, Presence?)+)>
<!ELEMENT GetPresGroupStatus (TransactionID,
    GroupID*)>
<!ELEMENT AddMembers (TransactionID, (GroupID,
    MemberList)+)
<!ELEMENT RemoveMembers (TransactionID,
    (GroupID, MemberList)+)>
<!ELEMENT DeletePresGroup (TransactionID,
    GroupID*)>
<!ELEMENT AddPresence (TransactionID, (GroupID,
    Presence)+)>
<!ELEMENT RemovePresence (TransactionID,
    (GroupID, Presence?)+)>
<!--End of DTD-->
```

B. Exemplary Presence Content Format

As stated above, the presence content can be divided in the following classes:

Client Availability: Presence attributes describing the availability of the client for communication, for instance, network reachability, GPRS attached, on/off status.

User Availability: Presence attributes describing the availability of the user for communication, for instance, ready, meeting, busy, away, in call, chatting, don't disturb, etc.

Local Conditions: Presence attributes describing the local environment at the user, for instance, local time, noisy/silent environment, in-door, out-door, location of the user, in terms of, for instance, geographical location, visited PLMN, city/street, premises.

Personal Status: Various personal attributes describing personal user status, for instance, mood, personal interests and intentions.

Client Capabilities: Presence attributes describing the capabilities of the client, for instance, to support different means of communication, different media types and different features.

User Attributes: Presence attributes allowing the client or the user to define their own textual presence values and references to external values.

Extended Presence Service: Service provider dynamically defined non-standard presence attributes which however need to be passed through standard presence servers and proxies.

B.1. Design Goals

The bulk of presence communication is sending the changes in the value part of presence items to the subscribers. Often only a single value has changed. In order to minimize the amount of transferred data the design goal is to keep the hierarchical representation of presence items as flat as possible. For this reason the presence items are scoped under the presence classes described above. Instead the classes may be given in the presence items as an optional attribute.

D.2 Common Attributes

The presence elements contain a variety of attributes most of which can be used in any presence item.

D.2.1 Version

Content Syntax: NMTOKENS

Mandatory: yes

Usage: This gives the version of the presence content format

D.2.2 Class

Content Syntax: NMTOKEN

Mandatory: no

Usage: This indicates the class the attribute belongs to. Possible values are: CLIENT_AVAILABILITY, USER_AVAILABILITY, LOCAL_CONDITIONS, PERSONAL_STATUS, CLIENT_CAPABILITIES, USER_ATTRIBUTES, EXT_PRES_SERVICE.

D.2.3 ID
Content Syntax: PUBIDLITERAL
Mandatory: no
Usage: This is a unique ID for a named presence item. It is assigned by the client.

D.2.4 Cacheability
Content Syntax: NMTOKEN
Mandatory: no
Usage: This indicates whether the presence item can be cached by proxies or not. The possible values are: YES, NO. It is assigned by the client. If this attribute is missing a value of NO is assumed.

D.2.5 ValidityPeriod
Content Syntax: NMTOKEN
Mandatory: no
Usage: This is a validity period for the cached presence item. The value is time in seconds. It is assigned by the presence server.

D.2.6 DeviceName
Content Syntax: NMTOKEN
Mandatory: no
Usage: This is the name of the client device. It is assigned by the client.

D.2.7 Accuracy
Content Syntax: NMTOKEN
Mandatory: no
Usage: This is the accuracy of a positioning device. It is given in meters.

D.2.8 ImageType
Content Syntax: NMTOKEN
Mandatory: no
Usage: This is the content encoding of an image. Some possible values are: JPEG, GIF, BMP.

D.2.9 SoundType
Content Syntax: NMTOKEN
Mandatory: no
Usage: This is the type of sound codec used to encode the sound. Some possible values are: AMR, EFR, MP3, MC, MIDI D.2.10 ExtRef
Content Syntax: PUBIDLITERAL
Mandatory: no
Usage: This is a URL giving an external reference.

D.2.11 ExtRefChange
Content Syntax: NMTOKEN
Mandatory: no
Usage: This indicates that the content of an external reference has changed. The possible values are: YES, NO D.2.12 ContentChange
Content Syntax: NMTOKEN
Mandatory: no
Usage: This is a counter from 0 to 255 which indicates a change in the content value. The server or proxy may store the contents (but is not required to) of the last 32 values. Same values for two contents within the last 32 values should correspond to same content D.3 Client Availability
D.3.1 DeviceOn
Content Model: (#PCDATA)
Attributes: Class, ID, Cacheability, ValidityPeriod, DeviceName
Usage: This gives the on/off status of the user terminal. The publisher adds this item into the role in the server by using the group management messages. Thereafter the value part is maintained by the network. The user may have more than one terminal in his presence information. In this case the use of ID attribute is mandatory. The content can have values "ON" or "OFF". When the user's terminal is on but outside network coverage the network assigns value "OFF" for this item.

D.3.2 DeviceRoaming
Content Model: (#PCDATA)
Attributes: Class, ID, Cacheability, ValidityPeriod, DeviceName
Usage: This indicates to the subscriber that the publisher is roaming in a visited network. The user may have more than one terminal in his presence information. In this case the use of ID attribute is mandatory. The content can have values "YES" or "NO"

D.3.3 NetworkType
Content Model: (#PCDATA)
Attributes: Class, ID, Cacheability, ValdityPeriod, DeviceName
Usage: This indicates the type of mobile network the publisher is currently attached. The content can have values "2G", "3G-99", "3G-R4" or "3G-R5". The user may have more than one terminal in his presence information. In this case the use of ID attribute is mandatory.

D.4 User Availability
D.4.1 UserStatus
Content Model: (#PCDATA)
Attributes: Class, ID, Cacheability, ValidityPeriod
Usage: This indicates the current status of the publisher in terms of amount of distraction he is willing to accept. The following values are defined: "available", "silent", "in-car", "busy".

D.4.2 PreferredContact
Content Model: (#PCDATA)
Attributes: Class, ID, Cacheability, ValidityPeriod
Usage: This indicates what is the current preferred contact method for the publisher. Following values are defined: "PHONE", "VOICE_MESSAGE", "MESSAGE", "MAIL", "NO_CONTACT".

D.4.3 PreferredDefaults
Content Model: ((TimePeriod, PrefCont)*)
Attributes: Class, ID, Cacheability, ValidityPeriod
Usage: This is presence metainformation that the publisher may send to presence server. The information is associated to a role as other presence information but this item is not available to subscribers. Instead it controls the values of the element 'PreferredContact'. It specifies a default preferred contact for given time periods. User specified time periods may overlap or a time period may even completely enclose another. The server changes the value of PreferredContact element according to the PreferredDefaults at the expiration of given periods. It however does not block a user changing the PreferredContact value directly. Also the user changing the PreferredContact value directly does not block the server changing it again when a period expires. The user may remove the default mechanism by sending this element with empty contents to the server.

D.4.4 TimePeriod
Content Model: (PeriodStart, PeriodEnd, RepetitionPeriod?, PeriodPrecedence)
Attributes: None
Usage: This describes the start of a period e.g. start time, the end of the period e.g. end time, the repetition period e.g. 'DAY' and the presedence of the period.

D.4.5 PeriodStart
  Content Model: (#PCDATA)
  Attributes: None
  Usage: This is the start period. It may be Time, Time-DayofWeek, Time-DayofMonth or a full date.
D.4.6 PeriodEnd
  Content Model: (#PCDATA)
  Attributes: None
  Usage: This is the start period. It may be Time, Time-DayofWeek, Time-DayofMonth or a full date. The resolution must be the same as in PeriodStart.
D.4.7 RepetitionPeriod
  Content Model: (#PCDATA)
  Attributes: None
  Usage: This gives the repetition period for the start-end. It must be one of the following values: "DAY", "WEEK", "MONTH". When this element is not included in the period description then it is assumed that no repetition is applied.
D.4.8 PeriodPrecedence
  Content Model: (#PCDATA)
  Attributes: None
  Usage: This element resolves the conflict between overlapping periods. It can have a numeric value between 0 and 9. Number 0 is the highest precedence. When two or more periods overlap then the server takes the contact preference associated with the highest precedence value.
D.4.9 PrefCont
  Content Model: (#PCDATA)
  Attributes: None
  Usage: This indicates what is the period associated default preferred contact method for the publisher. It can have the same values as the element 'PreferredContact'.
D.5 Local Conditions
D.5.1 LocalTime
  Content Model: (#PCDATA)
  Attributes: Class, ID, Cacheability, ValidityPeriod
  Usage: This gives the local time of the publisher
D.5.2 MeasuredLocation
  Content Model: (#PCDATA)
  Attributes: Class, ID, Cacheability, ValidityPeriod, Accuracy
  Usage: This gives the measured position of the client device. The measurements may be either sensor based (e.g. GPS) or network based or combination of both. The attribute Accuracy gives indication of the average positioning accuracy achieved by the method. The content includes at least the lateral position (x- and y-coordinates) but may include also the vertical position. If the service provider supports 'ConvertedLocation' described below then the MeasuredLocation may be input information for the service provider conversion process e.g. map matching.
D.5.3 ConvertedLocation
  Content Model: (#PCDATA)
  Attributes: Class, ID, Cacheability, ValidityPeriod
  Usage: This information is typically originated from the service provider but may also originate from the publisher. It gives the location of the user given in a human understandable text form such as a name of a street. The information is derived by converting a measured position into this form by e.g. map matching.
D.5.4 StatedLocation
  Content Model: (#PCDATA)
  Attributes: Class, ID, Cacheability, ValidityPeriod
  Usage: This is the location of the publisher as stated by the publisher himself. The content is a short text string.
D.5.5 UserEnvironment
  Content Model: (EnvAttributes+)
  Attributes: Class, ID, Cacheability, ValidityPeriod
  Usage: This gives some environmental attributes about the user.
D.5.6 EnvAttributes
  Content Model: (#PCDATA)
  Attributes: None
  Usage: The attributes defined are: "INDOOR", "OUTDOOR", "QUIET", "NOISY", "ALONE", "IN_GROUP".
D.6 Personal Status
D.6.1 StatusText
  Content Model: (#PCDATA)
  Attributes: Class, ID, Cacheability, ValidityPeriod
  Usage: This is a short text (about 30 characters) that the user may write.
D.6.2 StatusImage
  Content Model: (#CDATA)
  Attributes: Class, ID, Cacheability, ValidityPeriod, ImageType
  Usage: This is an image the user may attach to his status information. It is carried in the XML content in a transfer encoded form e.g. base64. The ImageType attribute describes the content encoding of the image e.g. jpeg.
D.6.3 StatusSound
  Content Model: (#CDATA)
  Attributes: Class, ID, Cacheability, ValidityPeriod, SoundType
  Usage: This is a short (about 5 to 30 seconds) sound clip the user may attach to his status information. It is carried in the XML content in a transfer encoded form e.g. base64. The SoundType attribute describes the content encoding of the sound e.g. AMR, MP3, AAC, MIDI etc.
D.7 Client Capabilities
  The client capabilities in the context of presence mean the capability of the device hosting the client for various types of human to human communication. This is very much different and simpler issue than the case of allowing an application software to take maximum advantage of the existing hw and sw capabilities of the client device.
  The classes of human to human communication are: messaging, e-mail, voice call and multimedia call. In particular presence is excluded from the communication classes. The purpose of presence is to make others aware of the communication means and other user attributes but not to be a two way communication means itself. For this reason the use of the term 'Client Capabilities' to classify presence information is somewhat misleading.
  The client capabilities are scoped with the network capabilities. This means for example that the publisher has the video call capability only when his client device has this capability AND the network he is currently roaming supports this capability. This makes the client capability information dynamic.
D.7.1 MessagingCapabilities
  Content Model: (MessType*)
  Attributes: Class, ID, Cacheability, ValidityPeriod
  Usage: This gives the dynamic messaging capability list of the client device. An empty list means that no messaging capabilities currently exist.

D.7.2 MessType
  Content Model: (#PCDATA)
  Attributes: None
  Usage: This gives the messaging capability type of the client device. The content may be one of the following: "SMS", "MMS" or "X-message application name". The field message application name is a device specific messaging method e.g. smart messaging.

D.7.3 EmailClient
  Content Model: (EmailClientType*)
  Attributes: Class, ID, Cacheability, ValidityPeriod
  Usage: This gives the dynamic e-mail capabilities of the client device. An empty list means that no e-mail capabilities currently exist.

D.7.4 EmailClientType
  Content Model: (#PCDATA)
  Attributes: None
  Usage: This gives the e-mail client type of the client device. The content may be one of the following: "SMTP", "POP3", "IMAP4" or "X-mail application name". The client software should not render the mail protocol names as such to the user. Instead the client software should understand the user device email environment and interpret these names in the scope of this email environment. The information presented to the user should be also meaningful to the user.

D.7.5 VoiceCallCapability
  Content Model: (#PCDATA)
  Attributes: Class, ID, Cacheability, ValidityPeriod
  Usage: This gives the dynamic voice call capabilities of the client device. The content is one of the following: "NONE", "VOICE_CALL", "RICH_VOICE_CALL".

D.7.6 MultimediaCallCapabilities
  Content Model: (MMCap*)
  Attributes: Class, ID, Cacheability, ValidityPeriod
  Usage: This gives the dynamic one-way and two-way multimedia communication capabilities of the user. An empty list indicates that no capabilities currently exist.

D.7.7 MMCap
  Content Model: (#PCDATA)
  Attributes: None
  Usage: This gives the multimedia call capability type. It may be one of the following: "UPLINK_VIDEO_STREAMING", "DOWNLINK_VIDEO_STREAMING", "VIDEO_CALL", "RICH_VIDEO_CALL".

D.8 User Attributes
  This class contains both user defined and client specific presence data.

D.8.1 UserPresenceItem
  Content Model: (#PCDATA)
  Attributes: Class, ID, Cacheability, ValidityPeriod, ExtRef, ExtRefChange
  Usage: This gives a means for the user to defined their own presence items. If more than one user specified presence item is defined for the same role then the use of ID attribute is mandatory. The content may be a short text. The optional attribute ExtRef is a URL of an external object referenced by this presence item. The URL may refer to another part of the multipart MIME that carries the XML-document of the presence item or it may be a reference to an external object. The optional attribute ExtRefChange may be used to indicate the subscribers that the external object has changed.

D.8.2 ClientTypeRequest
  Content Model: (EMPTY)
  Attributes: Class, ID, Cacheability, ValidityPeriod
  Usage: This is a special element used by the publisher to request the client types of his subscribers. When a publisher includes this element into his presence data for a given role then the server sends this to all the subscribers of the presence information with the PushPresence message. Optionally it may also be included in the PresenceItems message used by non-subscribers to request specific presence items. This element is not advertised in the PresenceInfo message. It is not a presence element that can be subscribed to. The presence server after having first time sent this item to the subscribers may periodically include this item also to further PushPresence messages to make sure that all the subscriber clients have this item.
  The clients upon receiving this item send their client types to the presence server. In addition a client should send it's type to the server every time the client is activated when this item is the presence info stored in the client.
  An alternative way of the publisher getting to know the client types of his subscribers would have been for the publisher to subscribe their client types. This however is a different business model. A publisher may not always want to be a subscriber of his own subscribers. This element allows the publisher to get the client types within the existing contractual frame between the publisher and the presence service provider. In addition this method mandates the subscriber client to send their types to the server. If the publisher would have used the subscription model to get the client types then the authorization of this information to the publisher would have been at the discretion of the subscriber.

D.8.3 ClientType
  Content Model: (ClientName, ClientManufacturer, ClientVersion)
  Attributes: Class, ID, Cacheability, ValidityPeriod
  Usage: Knowledge of the subscriber client types is used by publishers to enable client specific extensions to the presence set. It does not make sense for a publisher to use these extension items if his subscriber clients are not able to decode them.
  A subscriber client sends the client type info to the presence server using the UpdatePresence message. The GroupID used in the message belongs to the publisher's role and not to the subscriber's own role. This is an exception from the general rule that a user is allowed to update the presence information of his own role only. The presence server sends the information of this element to the publisher using the PushPresence message. The GroupID used belongs to the publisher role. From the publisher point of view then he is getting presence information from his own presence set.
  A publisher may include his own client type into his presence set. Then this information is handled like any other presence information and does not imply any special behaviour in presence servers or subscriber clients.

D.8.4 ClientName
  Content Model: (#PCDATA)
  Attributes: None
  Usage: This element gives the name of the presence client application D.8.5 ClientManufacture
  Content Model: (#PCDATA)
  Attributes: None
  Usage: This element gives the name of the presence client manufacture D.8.6 ClientVersion
  Content Model: (#PCDATA)
  Attributes: None
  Usage: This element gives the version of the client application.
D.8.7 ClientPresenceItem
  Content Model: (ClientType, CliPresItem)
  Attributes: Class, ID, Cacheability, ValidityPeriod, ContentChange
  Usage: This element is the publisher client application specific presence item. The ClientType is the client type of the publisher's presence client. No attributes are used in the ClientType item when used as part of this element. If the publisher defines more than one client specific presence item then the use of the ID attribute is mandatory. The optional attribute ContentChange is a counter from 0 to 255. When used it is increased by one every time the content of the presence item changes. This provides an alternative means for the presence server to detect change in the content of a non-standard presence item. The other alternative would have been for the presence server to assume that the content changes every time this item is sent to the server with the same ID attribute. The server behaves in this way when the ContentChange attribute is not used by the client. When two items with the same ID attribute have the same counter value in ContentChange then the content of these two items is the same.
D.8.8 CliPresItem
  Content Model: (#PCDATA)
  Attributes: None
  Usage: This element is the client specific presence extension. It's syntax and structure is assumed to be known to the client but not to the network elements.
D.9 Extended Presence Service
  The extended presence service class is meant to provide a service provider specific extension to the presence service. Like the client application specific extension only the service end points (i.e. the publisher and the subscriber clients) need to be able to decode the extensions. It is possible that the presence server also understands the extensions but this is not mandated by this document. The difference between the client specific extension method and this method is that the service provider controlled clients do not need to implement the standard presence items. It is assumed that the presence items are completely defined by the service provider and there is a means to update the user device hosted clients with new features. One possible update method is sw downloading via air. If a service provider creates new types of presence items then he needs to update the existing clients to support these new types. The service provider controlled client communicates with the presence server directly and not via a standard presence client. A standard presence client ignores all elements of this class.
  An extended presence service uses primarily the elements of this class. It is allowed to use also the standard presence element definitions. It uses the standard presence protocol.
D.9.1 ExtPresence
  Content Model: (#PCDATA)
  Attributes: Class, ID, Cacheability, ValidityPeriod, ContentChange
  Usage: The use of ID attribute is mandatory if more than one presence item is defined by this mechanism. The optional ContentChange attribute is available also for this element. The syntax and representation of the contents are not in the scope of this document. The presence servers and proxies should allow the contents to refer to objects carried in the same multipart MIME as the XML-documents containing this element.
D.10 DTD for the presence content format
  <!--Root element-->
  <!ELEMENT Presence (DeviceOn|DeviceRoaming|NetworkType|UserStatus|PreferredContact|PreferredDefaults|LocalTime|MeasuredLocation|ConvertedLocation|StatedLocation|UserEnvironment|StatusText|StatusImage|StatusSound|MessagingCapabilities|EmailClient|VoiceCallCapability|MultimediaCallCapabilities|UserPresenceItem|ClientTypeRequest|ClientType|ClientPresenceItem|ExtPresence)>
  <!ATTLIST Presence Version NMTOKENS #REQUIRED>
  <!ELEMENT DeviceOn (#PCDATA)>
  <!ATTLIST DeviceOn
    Class NMTOKEN #IMPLIED
    ID PUBIDLITERAL #IMPLIED
    Cacheability NMTOKEN #IMPLIED
    ValidityPeriod NMTOKEN #IMPLIED
    DeviceName NMTOKEN #IMPLIED>
  <!ELEMENT DeviceRoaming (#PCDATA)>
  <!ATTLIST DeviceRoaming
    Class NMTOKEN #IMPLIED
    ID PUBIDLITERAL #IMPLIED
    Cacheability NMTOKEN #IMPLIED
    ValidityPeriod NMTOKEN #IMPLIED
    DeviceName NMTOKEN #IMPLIED>
  <!ELEMENT NetworkType (#PCDATA)>
  <!ATTLIST NetworkType
    Class NMTOKEN #IMPLIED
    ID PUBIDLITERAL #IMPLIED
    Cacheability NMTOKEN #IMPLIED
    ValidityPeriod NMTOKEN #IMPLIED
    DeviceName NMTOKEN #IMPLIED>
  <!ELEMENT UserStatus (#PCDATA)>
  <!ATTLIST UserStatus
    Class NMTOKEN #IMPLIED
    ID PUBIDLITERAL #IMPLIED
    Cacheability NMTOKEN #IMPLIED
    ValidityPeriod NMTOKEN #IMPLIED>
  <!ELEMENT PreferredContact (#PCDATA)>
  <!ATTLIST PreferredContact
    Class NMTOKEN #IMPLIED
    ID PUBIDLITERAL #IMPLIED
    Cacheability NMTOKEN #IMPLIED
    ValidityPeriod NMTOKEN #IMPLIED>
  <!ELEMENT PreferredDefaults ((TimePeriod, PrefCont)*)>
  <!ATTLIST PreferredDefaults
    Class NMTOKEN #IMPLIED
    ID PUBIDLITERAL #IMPLIED
    Cacheability NMTOKEN #IMPLIED
    ValidityPeriod NMTOKEN #IMPLIED>
  <!ELEMENT TimePeriod (PeriodStart, PeriodEnd, RepetitionPeriod?, Period Precedence)>
  <!ELEMENT PeriodStart (#PCDATA)>
  <!ELEMENT PeriodEnd (#PCDATA)>
  <!ELEMENT RepetitionPeriod (#PCDATA)>
  <!ELEMENT PeriodPrecedence (#PCDATA)>
  <!ELEMENT PrefCont (#PCDATA)>

```
<!ELEMENT LocalTime (#PCDATA)>
<!ATTLIST LocalTime
   Class NMTOKEN #IMPLIED
   ID PUBIDLITERAL #IMPLIED
   Cacheability NMTOKEN #IMPLIED
   ValidityPeriod NMTOKEN #IMPLIED>
<!ELEMENT MeasuredLocation (#PCDATA)>
<!ATTLIST MeasuredLocation
   Class NMTOKEN #IMPLIED
   ID PUBIDLITERAL #IMPLIED
   Cacheability NMTOKEN #IMPLIED
   ValidityPeriod NMTOKEN #IMPLIED
   Accuracy NMTOKEN #IMPLIED>
<!ELEMENT ConvertedLocation (#PCDATA)>
<!ATTLIST ConvertedLocation
   Class NMTOKEN #IMPLIED
   ID PUBIDLITERAL #IMPLIED
   Cacheability NMTOKEN #IMPLIED
   ValidityPeriod NMTOKEN #IMPLIED>
<!ELEMENT StatedLocation (#PCDATA)>
<!ATTLIST StatedLocation
   Class NMTOKEN #IMPLIED
   ID PUBIDLITERAL #IMPLIED
   Cacheability NMTOKEN #IMPLIED
   ValidityPeriod NMTOKEN #IMPLIED>
<!ELEMENT UserEnvironment (EnvAttributes+)>
<!ATTLIST UserEnvironment
   Class NMTOKEN #IMPLIED
   ID PUBIDLITERAL #IMPLIED
   Cacheability NMTOKEN #IMPLIED
   ValidityPeriod NMTOKEN #IMPLIED>
<!ELEMENT EnvAttributes (#PCDATA)>
<!ELEMENT StatusText (#PCDATA)>
<!ATTLIST StatusText
   Class NMTOKEN #IMPLIED
   ID PUBIDLITERAL #IMPLIED
   Cacheability NMTOKEN #IMPLIED
   ValidityPeriod NMTOKEN #IMPLIED>
<!ELEMENT StatusImage (#CDATA)>
<!ATTLIST StatusImage
   Class NMTOKEN #IMPLIED
   ID PUBIDLITERAL #IMPLIED
   Cacheability NMTOKEN #IMPLIED
   ValidityPeriod NMTOKEN #IMPLIED
   ImageType NMTOKEN #IMPLIED>
<!ELEMENT StatusSound (#CDATA)>
<!ATTLIST StatusSound
   Class NMTOKEN #IMPLIED
   ID PUBIDLITERAL #IMPLIED
   Cacheability NMTOKEN #IMPLIED
   ValidityPeriod NMTOKEN #IMPLIED
   SoundType NMTOKEN #IMPLIED>
<!ELEMENT MessagingCapabilities (MessType*)>
<!ATTLIST MessagingCapabilities
   Class NMTOKEN #IMPLIED
   ID PUBIDLITERAL #IMPLIED
   Cacheability NMTOKEN #IMPLIED
   ValidityPeriod NMTOKEN #IMPLIED>
<!ELEMENT MessType (#PCDATA)>
<!ELEMENT EmailClient (EmailClientType*)>
<!ATTLIST EmailClientType
   Class NMTOKEN #IMPLIED
   ID PUBIDLITERAL #IMPLIED
   Cacheability NMTOKEN #IMPLIED
   ValidityPeriod NMTOKEN #IMPLIED>
<!ELEMENT EmailClientType (#PCDATA)>
<!ELEMENT VoiceCallCapability (#PCDATA)>
<!ATTLIST VoiceCallCapability
   Class NMTOKEN #IMPLIED
   ID PUBIDLITERAL #IMPLIED
   Cacheability NMTOKEN #IMPLIED
   ValidityPeriod NMTOKEN #IMPLIED>
<!ELEMENT MultimediaCallCapabilities (MMCap*)>
<!ATTLIST MultimediaCallCapabilities
   Class NMTOKEN #IMPLIED
   ID PUBIDLITERAL #IMPLIED
   Cacheability NMTOKEN #IMPLIED
   ValidityPeriod NMTOKEN #IMPLIED>
<!ELEMENT MMCap (#PCDATA)>
<!ELEMENT UserPresenceItem (#PCDATA)>
<!ATTLIST UserPresenceItem
   Class NMTOKEN #IMPLIED
   ID PUBIDLITERAL #IMPLIED
   Cacheability NMTOKEN #IMPLIED
   ValidityPeriod NMTOKEN #IMPLIED
   ExtRef PUBIDLITERAL #IMPLIED
   ExtRefChange NMTOKEN #IMPLIED>
<!ELEMENT ClientTypeRequest (EMPTY)>
<!ATTLIST ClientTypeRequest
   Class NMTOKEN #IMPLIED
   ID PUBIDLITERAL #IMPLIED
   Cacheability NMTOKEN #IMPLIED
   ValidityPeriod NMTOKEN #IMPLIED>
<!ELEMENT ClientType (ClientName, ClientManufacturer, ClientVersion)>
<!ATTLIST ClientType
   Class NMTOKEN #IMPLIED
   ID PUBIDLITERAL #IMPLIED
   Cacheability NMTOKEN #IMPLIED
   ValidityPeriod NMTOKEN #IMPLIED>
<!ELEMENT ClientName (#PCDATA)>
<!ELEMENT ClientManufacture (#PCDATA)>
<!ELEMENT ClientVersion (#PCDATA)>
<!ELEMENT ClientPresenceItem (ClientType, CliPresItem)>
<!ATTLIST ClientPresenceItem
   Class NMTOKEN #IMPLIED
   ID PUBIDLITERAL #IMPLIED
   Cacheability NMTOKEN #IMPLIED
   ValidityPeriod NMTOKEN #IMPLIED
   ContentChange NMTOKEN #IMPLIED>
<!ELEMENT CliPresItem (#PCDATA)>
<!ELEMENT ExtPresence (#PCDATA)>
<!ATTLIST ExtPresence
   Class NMTOKEN #IMPLIED
   ID PUBIDLITERAL #IMPLIED
   Cacheability NMTOKEN #IMPLIED
   ValidityPeriod NMTOKEN #IMPLIED
   ContentChange NMTOKEN #IMPLIED>
<!--End of DTD-->
```

D.11 DTD for PresenceNames

The DTD for PresenceNames is the same as for Presence except that only the presence item names and attributes are included. No presence values are used.

```
<!--Root element-->
<!ELEMENT PresenceNames (DeviceOn|DeviceRoaming|NetworkType|UserStatus|PreferredContact|PreferredDefaults|LocalTime|MeasuredLocation|ConvertedLocation|StatedLocation|UserEnvironment|StatusText|StatusImage|StatusSound|MessagingCapabilities|EmailClient|VoiceCallCapability|MultimediaCallCapabilities|UserPresenceItem|ClientTypeRequest|ClientType|ClientPresenceItem|ExtPresence)>
<!ATTLIST PresenceNames Version NMTOKENS #REQUIRED>
```

```
<!ELEMENT DeviceOn (EMPTY)>
<!ATTLIST DeviceOn
    Class NMTOKEN #IMPLIED
    ID PUBIDLITERAL #IMPLIED
    Cacheability NMTOKEN #IMPLIED
    ValidityPeriod NMTOKEN #IMPLIED
    DeviceName NMTOKEN #IMPLIED>
<!ELEMENT DeviceRoaming (EMPTY)>
<!ATTLIST DeviceRoaming
    Class NMTOKEN #IMPLIED
    ID PUBIDLITERAL #IMPLIED
    Cacheability NMTOKEN #IMPLIED
    ValidityPeriod NMTOKEN #IMPLIED
    DeviceName NMTOKEN #IMPLIED>
<!ELEMENT NetworkType (EMPTY)>
<!ATTLIST NetworkType
    Class NMTOKEN #IMPLIED
    ID PUBIDLITERAL #IMPLIED
    Cacheability NMTOKEN #IMPLIED
    ValidityPeriod NMTOKEN #IMPLIED
    DeviceName NMTOKEN #IMPLIED>
<!ELEMENT UserStatus (EMPTY)>
<!ATTLIST UserStatus
    Class NMTOKEN #IMPLIED
    ID PUBIDLITERAL #IMPLIED
    Cacheability NMTOKEN #IMPLIED
    ValidityPeriod NMTOKEN #IMPLIED>
<!ELEMENT PreferredContact (EMPTY)>
<!ATTLIST PreferredContact
    Class NMTOKEN #IMPLIED
    ID PUBIDLITERAL #IMPLIED
    Cacheability NMTOKEN #IMPLIED
    ValidityPeriod NMTOKEN #IMPLIED>
<!ELEMENT PreferredDefaults (EMPTY)>
<!ATTLIST PreferredDefaults
    Class NMTOKEN #IMPLIED
    ID PUBIDLITERAL #IMPLIED
    Cacheability NMTOKEN #IMPLIED
    ValidityPeriod NMTOKEN #IMPLIED>
<!ELEMENT LocalTime (EMPTY)>
<!ATTLIST LocalTime
    Class NMTOKEN #IMPLIED
    ID PUBIDLITERAL #IMPLIED
    Cacheability NMTOKEN #IMPLIED
    ValidityPeriod NMTOKEN #IMPLIED>
<!ELEMENT MeasuredLocation (EMPTY)>
<!ATTLIST MeasuredLocation
    Class NMTOKEN #IMPLIED
    ID PUBIDLITERAL #IMPLIED
    Cacheability NMTOKEN #IMPLIED
    ValidityPeriod NMTOKEN #IMPLIED
    Accuracy NMTOKEN #IMPLIED>
<!ELEMENT ConvertedLocation (EMPTY)>
<!ATTLIST ConvertedLocation
    Class NMTOKEN #IMPLIED
    ID PUBIDLITERAL #IMPLIED
    Cacheability NMTOKEN #IMPLIED
    ValidityPeriod NMTOKEN #IMPLIED>
<!ELEMENT StatedLocation (EMPTY)>
<!ATTLIST StatedLocation
    Class NMTOKEN #IMPLIED
    ID PUBIDLITERAL #IMPLIED
    Cacheability NMTOKEN #IMPLIED
    ValidityPeriod NMTOKEN #IMPLIED>
<!ELEMENT UserEnvironment (EMPTY)>
<!ATTLIST UserEnvironment
    Class NMTOKEN #IMPLIED
    ID PUBIDLITERAL #IMPLIED
    Cacheability NMTOKEN #IMPLIED
    ValidityPeriod NMTOKEN #IMPLIED>
<!ELEMENT StatusText (EMPTY)>
<!ATTLIST StatusText
    Class NMTOKEN #IMPLIED
    ID PUBIDLITERAL #IMPLIED
    Cacheability NMTOKEN #IMPLIED
    ValidityPeriod NMTOKEN #IMPLIED>
<!ELEMENT StatusImage (EMPTY)>
<!ATTLIST StatusImage
    Class NMTOKEN #IMPLIED
    ID PUBIDLITERAL #IMPLIED
    Cacheability NMTOKEN #IMPLIED
    ValidityPeriod NMTOKEN #IMPLIED
    ImageType NMTOKEN #IMPLIED>
<!ELEMENT StatusSound (EMPTY)>
<!ATTLIST StatusSound
    Class NMTOKEN #IMPLIED
    ID PUBIDLITERAL #IMPLIED
    Cacheability NMTOKEN #IMPLIED
    ValidityPeriod NMTOKEN #IMPLIED
    SoundType NMTOKEN #IMPLIED>
<!ELEMENT MessagingCapabilities (EMPTY)>
<!ATTLIST MessagingCapabilities
    Class NMTOKEN #IMPLIED
    ID PUBIDLITERAL #IMPLIED
    Cacheability NMTOKEN #IMPLIED
    ValidityPeriod NMTOKEN #IMPLIED>
<!ELEMENT EmailClient (EMPTY)>
<!ATTLIST EmailClientType
    Class NMTOKEN #IMPLIED
    ID PUBIDLITERAL #IMPLIED
    Cacheability NMTOKEN #IMPLIED
    ValidityPeriod NMTOKEN #IMPLIED>
<!ELEMENT VoiceCallCapability (EMPTY)>
<!ATTLIST VoiceCallCapability
    Class NMTOKEN #IMPLIED
    ID PUBIDLITERAL #IMPLIED
    Cacheability NMTOKEN #IMPLIED
    ValidityPeriod NMTOKEN #IMPLIED>
<!ELEMENT MultimediaCallCapabilities (EMPTY)>
<!ATTLIST MultimediaCallCapabilities
    Class NMTOKEN #IMPLIED
    ID PUBIDLITERAL #IMPLIED
    Cacheability NMTOKEN #IMPLIED
    ValidityPeriod NMTOKEN #IMPLIED>
<!ELEMENT UserPresenceItem (EMPTY)>
<!ATTLIST UserPresenceItem
    Class NMTOKEN #IMPLIED
    ID PUBIDLITERAL #IMPLIED
    Cacheability NMTOKEN #IMPLIED
    ValidityPeriod NMTOKEN #IMPLIED
    ExtRef PUBIDLITERAL #IMPLIED
    ExtRefChange NMTOKEN #IMPLIED>
<!ELEMENT ClientType (EMPTY)>
<!ATTLIST ClientType
    Class NMTOKEN #IMPLIED
    ID PUBIDLITERAL #IMPLIED
    Cacheability NMTOKEN #IMPLIED
    ValidityPeriod NMTOKEN #IMPLIED>
```

```
<!ELEMENT ClientPresenceItem (EMPTY)>
<!ATTLIST ClientPresenceItem
    Class NMTOKEN #IMPLIED
    ID PUBIDLITERAL #IMPLIED
    Cacheability NMTOKEN #IMPLIED
    ValidityPeriod NMTOKEN #IMPLIED
    ContentChange NMTOKEN #IMPLIED>
<!ELEMENT ExtPresence (EMPTY)>
<!ATTLIST ExtPresence
    Class NMTOKEN #IMPLIED
    ID PUBIDLITERAL #IMPLIED
    Cacheability NMTOKEN #IMPLIED
    ValidityPeriod NMTOKEN #IMPLIED
    ContentChange NMTOKEN #IMPLIED>
<!--End of DTD-->
```

It will be evident to those skilled in the art that as technology advances, the inventive concept can be implemented in many different ways. Therefore the invention and its embodiments are not limited to the above examples but may vary within the scope and spirit of the appended claims.

The invention claimed is:

1. An apparatus comprising:
at least one processor; and
at least one memory including computer program code for one or more programs,
the at least one memory and the computer program code configured to, with the at least one processor, cause the apparatus to perform at least the following,
determine to transmit presence information associated with a device and a user of the device to a service,
wherein the presence information comprises a plurality of presence attributes, each respective presence attribute in the plurality associated with an identifier and at least one value field,
wherein different presence attributes of the plurality are associated with the device and the user of the device,
generate a new presence attribute based on at least one of the plurality of presence attributes,
wherein the new presence attribute adds a qualifier element to the at least one of the plurality of presence attributes, the qualifier element comprising one or more parameters specifying a utilization of the new presence attribute,
wherein the new presence attribute is maintained separately from the plurality of presence attributes and utilized to designate access to the presence information by one or more members of a service,
specify, in the qualifier element of the new presence attribute, one or more presentation settings of the new presence attribute,
wherein the new presence attribute is specified via the qualifier element as further utilized to designate one or more presentations of the presence information to the one or more members, and
specify, in the qualifier element of the new presence attribute, how the presence information is utilized in a receiving client device associated with the one or more members,
wherein the qualifier element designates one or more parameters to one or more applications associated with the receiving client device,
wherein the designation of the one or more parameters to the one or more applications associated with the receiving client device provides a basis for interaction between the device and the receiving client device based on the qualifier element of the new presence attribute.

2. The apparatus according to claim 1, the apparatus further configured to:
specify an authority element associated with the new presence attribute by adding the authority element to the at least one of the plurality of presence attributes, the authority element comprising one or more parameters specifying a body having responsibility for keeping an identifier and at least one value associated with the new presence attribute unique.

3. The apparatus according to claim 2, wherein the authority element includes an authority string indicative of the body.

4. The apparatus according to claim 1, wherein the presence information associated with the device are stored in a database as presence information of a publisher user in association with a presence group, the presence information of the publisher user comprising one or more presence sets, a presence set comprising one or more presence attributes belonging to a single publisher role of the publisher user in association with the presence group.

5. The apparatus according to claim 4, wherein a user of the device is a publisher user that is able to use the device or more than one device in more than one publisher role.

6. A method comprising:
determining, by a processor, to transmit presence information associated with a device and a user of the device to a service,
wherein the presence information comprises a plurality of presence attributes, each respective presence attribute in the plurality associated with an identifier and at least one value field,
wherein different presence attributes of the plurality are associated with the device and the user of the device;
generating, by the processor, a new presence attribute based on at least one of the plurality of presence attributes,
wherein the new presence attribute adds a qualifier element to the at least one of the plurality of presence attributes, the qualifier element comprising one or more parameters specifying a utilization of the new presence attribute,
wherein the new presence attribute is maintained separately from the plurality of presence attributes and utilized to designate access to the presence information by one or more members of a service;
specifying, in the qualifier element of the new presence attribute, one or more presentation settings of the new presence attribute,
wherein the new presence attribute is specified via the qualifier element as further utilized to designate one or more presentations of the presence information to the one or more members; and
specifying, in the qualifier element of the new presence attribute, how the presence information is utilized in a receiving client device associated with the one or more members,
wherein the qualifier element designates one or more parameters to one or more applications associated with the receiving client device,
wherein the designation of the one or more parameters to the one or more applications associated with the receiving client device provides a basis for interaction between the device and the receiving client device based on the qualifier element of the new presence attribute.

7. The method according to claim 6, the method further comprising:
specifying an authority element associated with the new presence attribute by adding the authority element to the at least one of the plurality of presence attributes, the authority element comprising one or more parameters specifying a body having responsibility for keeping an identifier and at least one value associated with the new presence attribute unique.

8. A non-transitory computer-readable storage medium carrying one or more sequences of one or more instructions which, when executed by one or more processors, cause an apparatus to at least perform the following steps:
determining, by a processor, to transmit presence information associated with a device and a user of the device to a service,
wherein the presence information comprises a plurality of presence attributes, each respective presence attribute in the plurality associated with an identifier and at least one value field,
wherein different presence attributes of the plurality are associated with the device and the user of the device;
generating, by the processor, a new presence attribute, based on at least one of the plurality of presence attributes,
wherein the new presence attribute adds a qualifier element to the at least one of the plurality of presence attributes, the qualifier element comprising one or more parameters specifying a utilization of the new presence attribute,
wherein the new presence attribute is maintained separately from the plurality of presence attributes and utilized to designate access to the presence information by one or more members of a service;
specifying, in the qualifier element of the new presence attribute, one or more presentation settings of the new presence attribute,
wherein the new presence attribute is specified via the qualifier element as further utilized to designate one or more presentations of the presence information to the one or more members; and
specifying, in the qualifier element of the new presence attribute, how the presence information is utilized in a receiving client device associated with the one or more members,
wherein the qualifier element designates one or more parameters to one or more applications associated with the receiving client device,
wherein the designation of the one or more parameters to the one or more applications associated with the receiving client device provides a basis for interaction between the device and the receiving client device based on the qualifier element of the new presence attribute.

* * * * *